(12) United States Patent
Furukawa

(10) Patent No.: US 9,817,996 B2
(45) Date of Patent: Nov. 14, 2017

(54) INFORMATION RECEIVING DEVICE, INFORMATION RECEIVING METHOD, AND MEDIUM

(71) Applicant: NEC CORPORATION, Tokyo (JP)

(72) Inventor: Ryo Furukawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 25 days.

(21) Appl. No.: 14/775,805

(22) PCT Filed: Mar. 7, 2014

(86) PCT No.: PCT/JP2014/001286
§ 371 (c)(1),
(2) Date: Sep. 14, 2015

(87) PCT Pub. No.: WO2014/141659
PCT Pub. Date: Sep. 18, 2014

(65) Prior Publication Data
US 2016/0048702 A1 Feb. 18, 2016

(30) Foreign Application Priority Data
Mar. 15, 2013 (JP) .................................. 2013-053077

(51) Int. Cl.
G06F 21/62 (2013.01)
G06Q 30/02 (2012.01)
H04L 29/08 (2006.01)

(52) U.S. Cl.
CPC .......... *G06F 21/6245* (2013.01); *G06Q 30/02* (2013.01); *H04L 67/22* (2013.01); *G06F 2221/2111* (2013.01)

(58) Field of Classification Search
CPC .............................. G06F 21/6245; H04L 67/22
(Continued)

(56) References Cited

U.S. PATENT DOCUMENTS

2002/0156845 A1 10/2002 Sakata
2003/0004781 A1* 1/2003 Mallon .................. G06Q 10/06
705/7.31
(Continued)

FOREIGN PATENT DOCUMENTS

JP 2002-312377 A 10/2002
JP 2003-256713 A 9/2003
(Continued)

OTHER PUBLICATIONS

Keizer, "Machine Learning for Social Multiparty Human-Robot Interaction", Oct. 2014, ACM, vol. 4, p. 1-32.*
(Continued)

*Primary Examiner* — Kenneth Chang
*Assistant Examiner* — Gregory Lane
(74) *Attorney, Agent, or Firm* — Sughrue Mion, PLLC

(57) ABSTRACT

An information receiving device according to the present invention includes: a request information generation unit which generates request information including actual behavior information which is behavior information representing an actual behavior of a user, and pseudo behavior information not representing an actual behavior of the user; a distribution information request unit which transmits the request information to an information distribution device, and receives distribution information distributed from the information distribution device on a basis of the transmission of the request information; and a distribution information selection unit which selects distribution information associated with the actual behavior information, out of the distribution information received by the distribution information request unit.

9 Claims, 21 Drawing Sheets

(58) Field of Classification Search
USPC .......................................................... 726/28
See application file for complete search history.

(56) References Cited

U.S. PATENT DOCUMENTS

| | | | | |
|---|---|---|---|---|
| 2005/0015488 | A1* | 1/2005 | Bayyapu | H04L 67/306 |
| | | | | 709/225 |
| 2009/0234810 | A1* | 9/2009 | Angell | G06Q 30/02 |
| 2011/0029902 | A1* | 2/2011 | Bailey | G06F 21/36 |
| | | | | 715/764 |
| 2011/0119253 | A1 | 5/2011 | Grabarnik et al. | |
| 2012/0284299 | A1 | 11/2012 | Ishikawa et al. | |
| 2012/0290950 | A1* | 11/2012 | Rapaport | H04L 51/32 |
| | | | | 715/753 |
| 2012/0304007 | A1* | 11/2012 | Hanks | H04L 67/12 |
| | | | | 714/26 |
| 2013/0291107 | A1* | 10/2013 | Marck | G06F 21/316 |
| | | | | 726/23 |
| 2014/0189525 | A1* | 7/2014 | Trevisiol | G06F 17/30 |
| | | | | 715/745 |

FOREIGN PATENT DOCUMENTS

| | | |
|---|---|---|
| JP | 2012-033088 A | 2/2012 |
| WO | 2010/050195 A1 | 5/2010 |
| WO | 2011/013490 A1 | 2/2011 |

OTHER PUBLICATIONS

International Search Report of PCT/JP2014/001286 dated Jun. 3, 2014.
Kido et al., "A Method to Protect Location Privacy using Dummies and Its Cost Evaluation for Location-based Services", Graduate School of Information Science and Technology, Osaka University, Jul. 4, 2017 search, http://www.ieice.org/iss/de/DEWS/DEWS2005/procs/papapers/3A-i5.pdf. (8 pages total).
Communication dated Jul. 11, 2017 from the Japanese Patent Office in counterpart application No. 2015-505276.

* cited by examiner

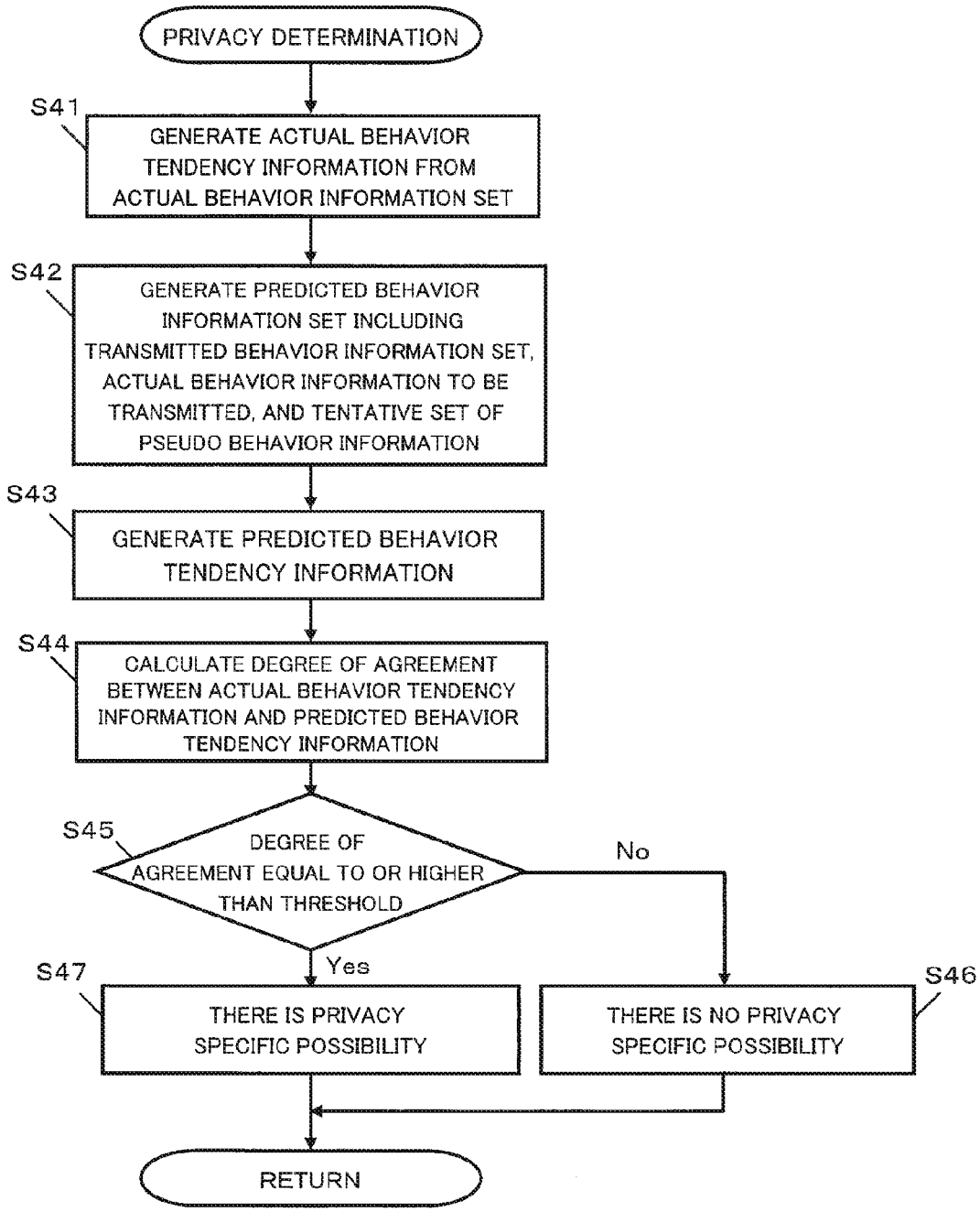

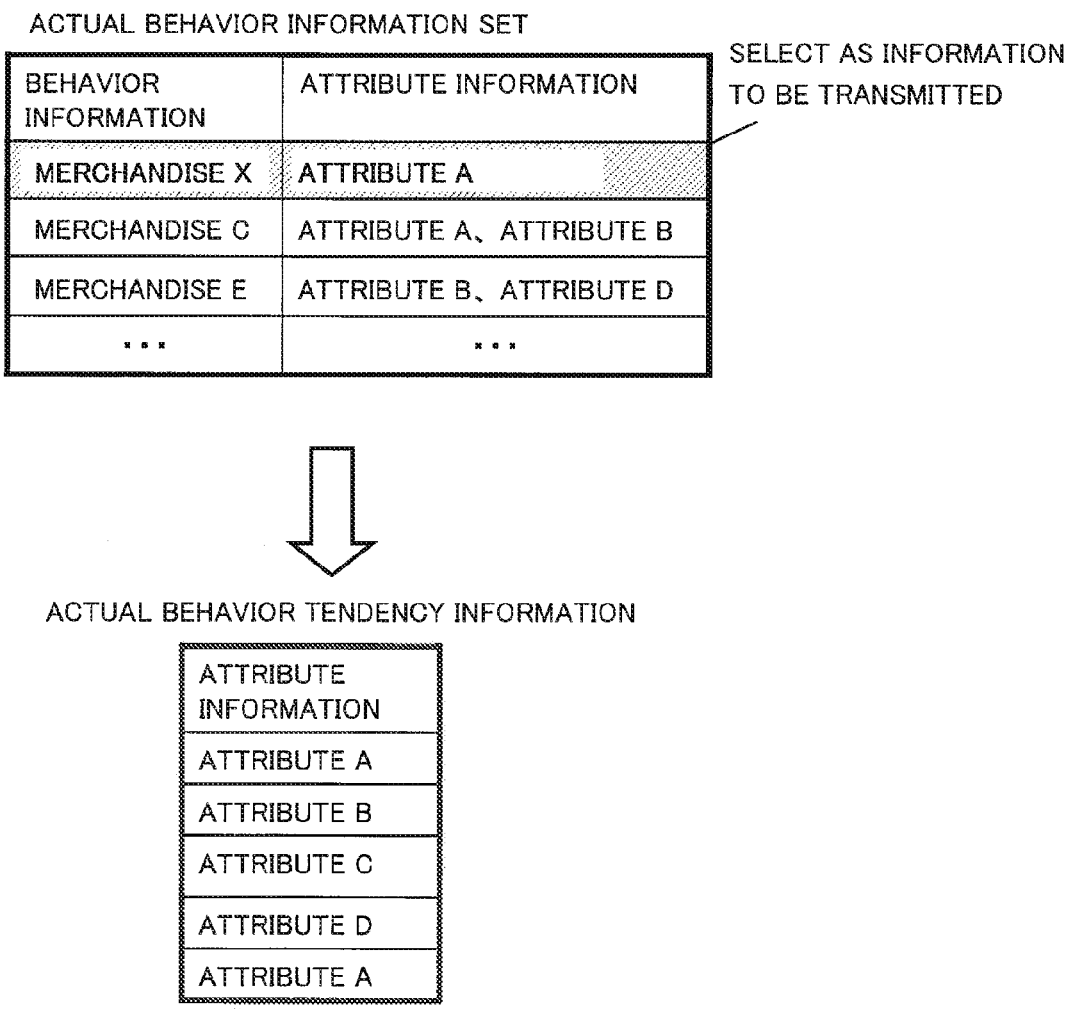

Fig. 10

TRANSMITTED BEHAVIOR INFORMATION SET

| BEHAVIOR INFORMATION | ATTRIBUTE INFORMATION |
|---|---|
| MERCHANDISE E | ATTRIBUTE B, ATTRIBUTE D |
| MERCHANDISE D | ATTRIBUTE E, ATTRIBUTE F |
| MERCHANDISE H | ATTRIBUTE H, ATTRIBUTE I |
| MERCHANDISE C | ATTRIBUTE A, ATTRIBUTE B |
| MERCHANDISE F | ATTRIBUTE E, ATTRIBUTE G |
| MERCHANDISE M | ATTRIBUTE E, ATTRIBUTE H |
| MERCHANDISE K | ATTRIBUTE H |
| ... | ... |

PREDICTED BEHAVIOR INFORMATION SET

| BEHAVIOR INFORMATION | ATTRIBUTE INFORMATION |
|---|---|
| MERCHANDISE E | ATTRIBUTE B, ATTRIBUTE D |
| MERCHANDISE D | ATTRIBUTE E, ATTRIBUTE F |
| MERCHANDISE H | ATTRIBUTE H, ATTRIBUTE I |
| MERCHANDISE C | ATTRIBUTE A, ATTRIBUTE B |
| MERCHANDISE F | ATTRIBUTE E, ATTRIBUTE G |
| MERCHANDISE M | ATTRIBUTE E, ATTRIBUTE H |
| MERCHANDISE K | ATTRIBUTE H |
| ... | ... |
| MERCHANDISE X | ATTRIBUTE A |
| MERCHANDISE X | ATTRIBUTE H, ATTRIBUTE J |

ACTUAL BEHAVIOR INFORMATION
CANDIDATE OF PSEUDO BEHAVIOR INFORMATION

FREQUENCY DISTRIBUTION OF TRANSMITTED ATTRIBUTE

| ATTRIBUTE INFORMATION | FREQUENCY |
|---|---|
| ATTRIBUTE A | 0.12 |
| ATTRIBUTE B | 0.14 |
| ATTRIBUTE C | 0.06 |
| ATTRIBUTE D | 0.05 |
| ATTRIBUTE E | 0.145 |
| ATTRIBUTE F | 0.02 |
| ATTRIBUTE G | 0.13 |
| ATTRIBUTE H | 0.17 |
| ATTRIBUTE I | 0.125 |
| ATTRIBUTE J | 0.04 |

CALCULATE DECLINE
CALCULATE INCREASE WITH WEIGHT OF 1.0
CALCULATE INCREASE WITH WEIGHT OF 0.5

FREQUENCY DISTRIBUTION OF PREDICTED ATTRIBUTE

| ATTRIBUTE INFORMATION | FREQUENCY |
|---|---|
| ATTRIBUTE A | 0.127 |
| ATTRIBUTE B | 0.137 |
| ATTRIBUTE C | 0.059 |
| ATTRIBUTE D | 0.049 |
| ATTRIBUTE E | 0.142 |
| ATTRIBUTE F | 0.02 |
| ATTRIBUTE G | 0.127 |
| ATTRIBUTE H | 0.171 |
| ATTRIBUTE I | 0.123 |
| ATTRIBUTE J | 0.044 |

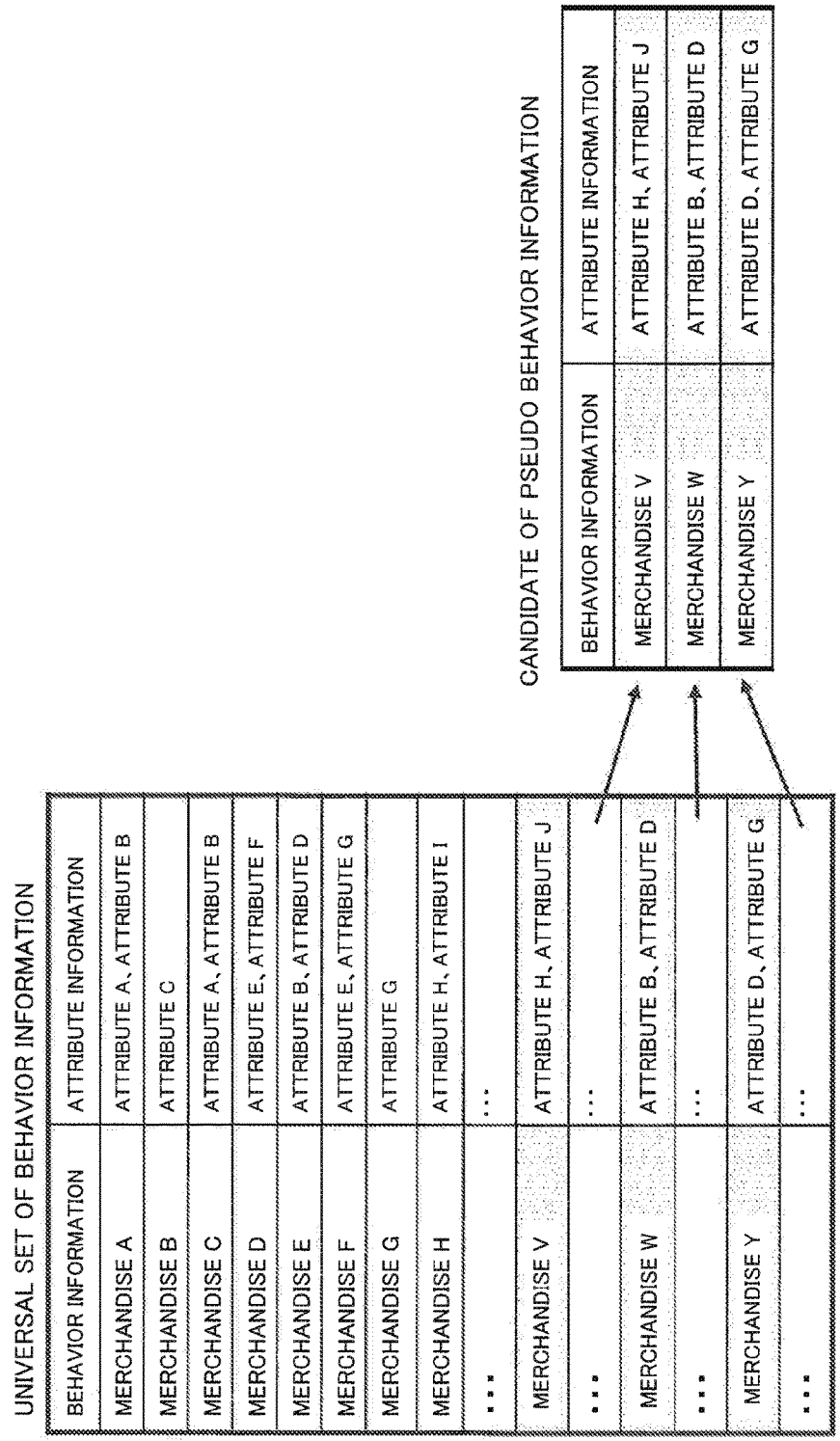

Fig.12

EVALUATION VALUE CALCULATED ABOUT CANDIDATE OF PSEUDO BEHAVIOR INFORMATION

| BEHAVIOR INFORMATION | ATTRIBUTE INFORMATION | EVALUATION VALUE |
|---|---|---|
| MERCHANDISE V | ATTRIBUTE H, ATTRIBUTE J | −0.00700 |
| MERCHANDISE W | ATTRIBUTE B, ATTRIBUTE D | −0.02255 |
| MERCHANDISE Y | ATTRIBUTE D, ATTRIBUTE G | −0.01294 |

INFORMATION RECEIVING DEVICE, INFORMATION RECEIVING METHOD, AND MEDIUM

CROSS REFERENCE TO RELATED APPLICATIONS

This is a National Stage of International Application No. PCT/JP2014/001286 filed Mar. 7, 2014, claiming priority based on Japanese Patent Application No. 2013-053077 filed Mar. 15, 2013, the contents of all of which are incorporated herein by reference in their entirety.

TECHNICAL FIELD

The present invention relates to a technique of receiving information distributed from a server.

BACKGROUND ART

A technique is known that includes selecting distribution information on the basis of behavior information representing the behavior of a user, and transmitting the selected distribution information to a terminal device of the user (see, for example, Patent Literature (PLT) 1). Here, for examples, the behavior information is "position information" indicating the position of the user terminal, or "purchase information" indicating the merchandise that the user has purchased.

A server apparatus according to PLT 1 includes a registrant file in which information of users possessing a user terminal is registered, and a purchase history file in which the purchase history is collected and registered. The server apparatus according to PLT 1 also includes a position information file (behavior pattern file) in which positions associated with the behavior of the registrants are collected by using the Global Positioning System (GPS), and an advertisement request file containing distribution information representing an advertisement. The server apparatus according to PLT 1 extracts the registrant to whom the distribution information representing the advertisement is to be transmitted, on the basis of the purchase history file, the behavior pattern file, and the advertisement request file.

The related technique according to PLT 1 enables transmission of the distribution information appropriately selected on the basis of the behavior information of the user, such as the purchase information or the position information (in other words "personalized service") to the user terminal.

The behavior information of the user is, however, privacy information of the user providing the information. Accordingly, the user may be reluctant to allow the service provider to specify the user's behavior information.

Therefore, techniques related to the present invention for dealing with the mentioned issue have been proposed (see, for example, PLT 2). A data processing apparatus according to PLT 2 acquires the user's behavior information and provides the acquired information to a service providing apparatus. At the time of the provision, however, the data processing apparatus according to PLT 2 determines whether or not the acquired behavior information is to be hidden, on the basis of a user disclosure policy and so on. The data processing apparatus according to PLT 2 then substitutes the behavior information determined to be hidden with pseudo behavior information, and provides the substituted information to the service providing apparatus. Through such a procedure, the technique according to PLT 2 hides the user's behavior information if need be, to thereby protect the privacy information.

CITATION LIST

Patent Literature

[PLT 1] Japanese Patent Laid-Open Publication No. 2003-256713
[PLT 2] International Publication No. WO2010/050195

SUMMARY OF INVENTION

Technical Problem

However, the techniques related to the present invention disclosed in PLT 1 and PLT 2 have the following problems.

With the related technique according to PLT 1, the server apparatus selects the user to whom the information is to be distributed, on the basis of the behavior information provided by the user. Accordingly, the user is unable to obtain the distribution information based on the behavior information, unless the user provides the behavior information.

In addition, with the related technique according to PLT 2, although a part of the behavior information is hidden, the remaining portion of the hidden behavior information that has not been hidden is accumulated in the service providing apparatus. Accordingly, the service providing apparatus may be able to specify the tendency of the user's behavior on the basis of the accumulated behavior information. Therefore, although the related technique according to PLT 2 hides a part of the behavior information, the technique is unable to sufficiently protect the privacy information representing the tendency of the user's behavior.

In the case where the related technique according to PLT 2 is applied to the related technique according to PLT 1, the server apparatus is unable to specify the original behavior information of the user on the basis of the pseudo behavior information of the user, and hence appropriate distribution information is unable to be provided to the user terminal. Therefore, the user is unable to obtain the desired distribution information in the case where the user hides a part of the behavior information and provides the pseudo behavior information.

Thus, the related techniques according to PLT 1 and PLT 2 have a problem in that the related techniques are unable to both protect the privacy information representing the user's behavior and the tendency thereof, and provide the distribution information appropriate for the user, at the same time.

An objective of the present invention is to provide an information receiving device, an information receiving system, an information receiving method, and a medium that can solve the foregoing problem.

Solution to Problem

An information receiving device according to an aspect of the present invention includes: a request information generation unit which generates request information including actual behavior information which is behavior information representing an actual behavior of a user, and pseudo behavior information not representing an actual behavior of the user; a distribution information request unit which transmits the request information to an information distribution device, and receives distribution information distributed from the information distribution device on a basis of the transmission of the request information; and a distribution information selection unit which selects distribution information associated with the actual behavior information, out of the distribution information received by the distribution information request unit.

An information receiving system according to an aspect of the present invention includes: the above-mentioned information receiving device; and an information distribution device which returns distribution information based on the request information transmitted from the information receiving device.

An information receiving method according to an aspect of the present invention to be executed by an information receiving device, the method includes: generating request information including actual behavior information which is behavior information representing an actual behavior of a user, and pseudo behavior information not representing an actual behavior of the user; transmitting the request information to an information distribution device, and receiving distribution information distributed from the information distribution device on a basis of the transmission of the request information; and selecting distribution information associated with the actual behavior information, out of the received distribution information.

A computer-readable non-transitory storage medium embodying a program, the program causing an information receiving device to perform a method. The method includes: generating request information including actual behavior information which is behavior information representing an actual behavior of a user, and pseudo behavior information not representing an actual behavior of the user; transmitting the request information to an information distribution device, and receiving distribution information distributed from the information distribution device on a basis of the transmission of the request information; and selecting distribution information associated with the actual behavior information, out of the received distribution information.

Advantageous Effects of Invention

The present invention can provides a technique that enables both protection of privacy information representing a user's behavior and the tendency thereof, and provision of distribution information more appropriate for the user.

BRIEF DESCRIPTION OF DRAWINGS

FIG. 8 is a flowchart for explaining a privacy determination process performed by the information receiving system according to the second exemplary embodiment of the present invention.

FIG. 9 is a figure showing an example of an actual behavior information set and actual behavior tendency information according to the second exemplary embodiment of the present invention.

FIG. 10 is a figure showing an example of a transmitted behavior information set, transmitted attribute frequency distribution, a predicted behavior information set, and predicted attribute frequency distribution according to the second exemplary embodiment of the present invention.

FIG. 11 is a figure showing an example of a universal set of the behavior information, and a candidate of pseudo behavior information extracted from the behavior information universal set, according to the second exemplary embodiment of the present invention.

FIG. 12 is a figure showing examples of evaluation values calculated with respect to each candidate of possible pseudo behavior information according to the second exemplary embodiment of the present invention.

DESCRIPTION OF EMBODIMENTS

Hereafter, exemplary embodiments of the present invention will be described in details, with reference to the drawings.

First Exemplary Embodiment

Figure 1:
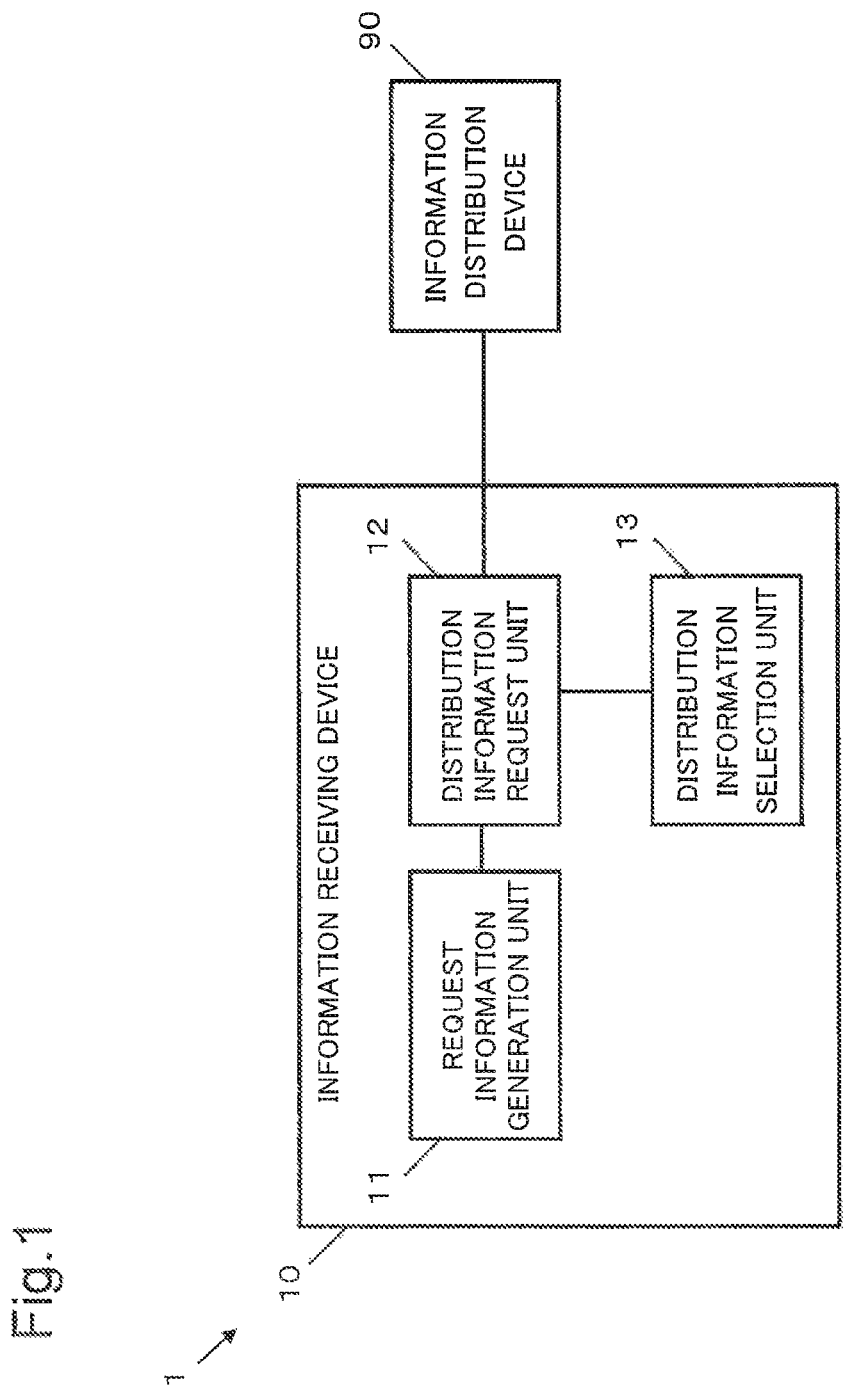
FIG. 1 is a functional block diagram of an information receiving system according to a first exemplary embodiment of the present invention.

A functional block diagram of an information receiving system 1 according to a first exemplary embodiment of the present invention is shown in FIG. 1. In FIG. 1, the information receiving system 1 includes an information receiving device 10 and an information distribution device 90. The information receiving device 10 and the information distribution device 90 are communicably connected to each other via various types of network such as Internet, a local area network (LAN), a public network, a wireless communication network or a combination thereof. FIG. 1 illustrates one each of the information receiving device 10 and the information distribution device 90. However, the number of devices provided in the information receiving system according to the present invention is not limited to the number of devices illustrated in FIG. 1.

As shown in FIG. 1, the information receiving device 10 includes a request information generation unit 11, a distribution information request unit 12, and a distribution information selection unit 13.

Figure 2:
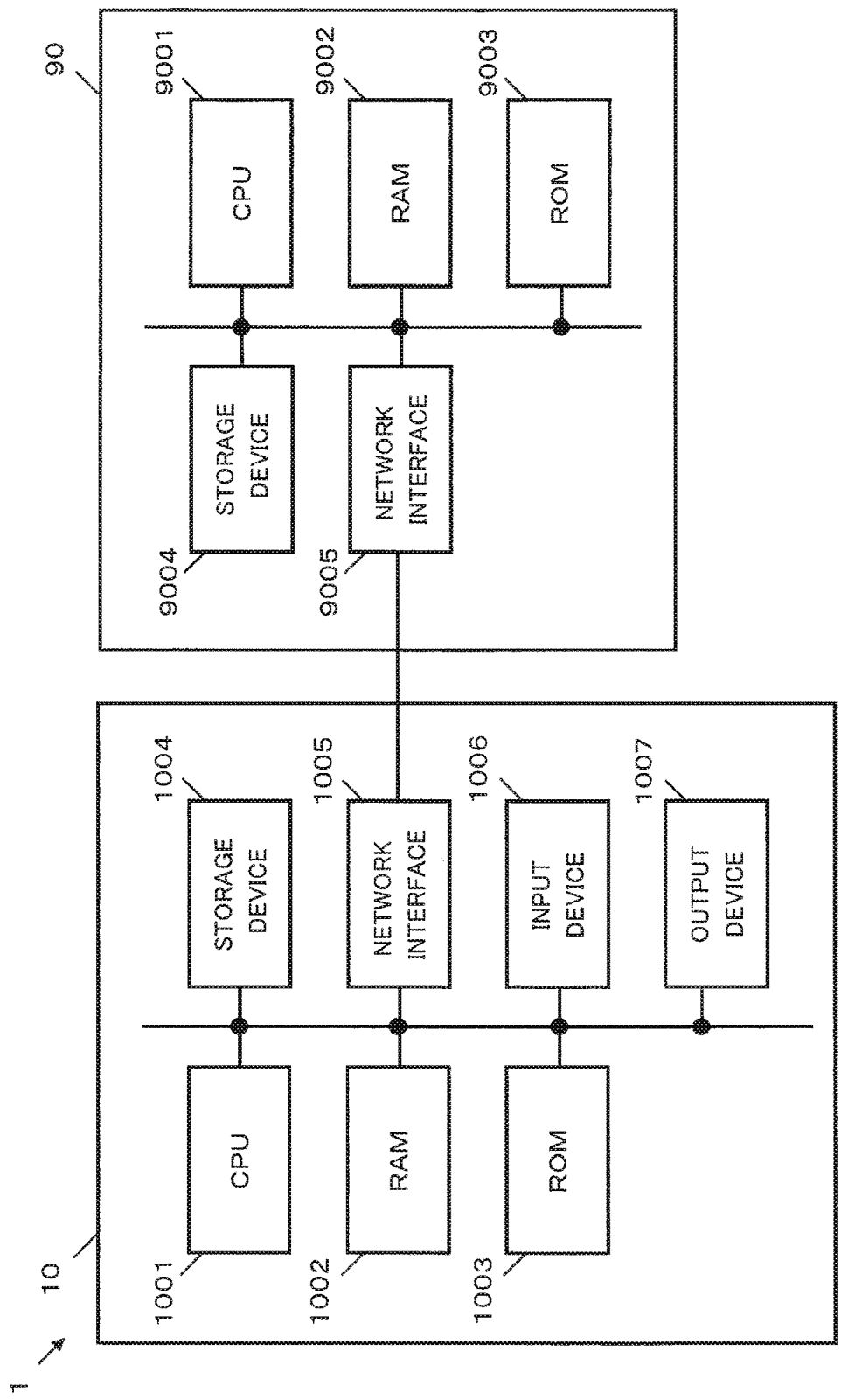
FIG. 2 is a block diagram showing a hardware configuration of the information receiving system according to the first exemplary embodiment of the present invention.

As shown in FIG. 2, the information receiving device 10 may be constituted of a computer device including a central processing unit (CPU) 1001, a random access memory (RAM) 1002, and a read only memory (ROM) 1003. Furthermore, as shown in FIG. 2, the information receiving device 10 may also be constituted of a computer device including a storage device 1004 such as a hard disk, a network interface 1005, an input device 1006, and an output device 1007.

With the configuration shown in FIG. 2, the request information generation unit 11 is constituted of the CPU 1001 that reads a computer program and various data stored in the ROM 1003 and/or the storage device 1004 into the RAM 1002, and executes the computer program.

The distribution information request unit 12 is constituted of the input device 1006, the network interface 1005, the ROM 1003, the storage device 1004, the RAM 1002, and the CPU 1001. The CPU 1001 reads the computer program and various data stored in the ROM 1003 and/or the storage device 1004 into the RAM 1002, and realizes the function of the distribution information request unit 12.

The distribution information selection unit 13 is constituted of the output device 1007 and the CPU 1001 that reads the computer program and various data stored in the ROM 1003 and/or the storage device 1004 into the RAM 1002, and executes the computer program.

The hardware configuration of the information receiving device 10 and the functional blocks cited above is not limited to the above description.

As, shown in FIG. 2, the information distribution device 90 may be constituted of a computer device including a CPU 9001, a RAM 9002, a ROM 9003, a storage device 9004 such as a hard disk, and a network interface 9005.

With the configuration shown in FIG. 2, the function of the information distribution device 90 is realized by the network interface 9005 and the CPU 9001 that reads a computer program and various data stored in the ROM 9003 and the storage device 9004 into the RAM 9002, and executes the computer program. The hardware configuration of the information distribution device 90 is not limited to the above description.

Hereunder, the functional blocks of the information receiving device 10 will be described in details.

The request information generation unit 11 generates request information including actual behavior information of a user, and pseudo behavior information of the user.

The "actual behavior information" is the information representing the actual behavior of the user. The actual behavior information may be, for example, information collected by a behavior information collection unit (not shown) installed in the information receiving device 10. For example, the actual behavior information may be position information representing the position of the user carrying the information receiving device 10, or merchandise information representing a purchase behavior of the user by using the information receiving device 10. The position information may be information collected, for example, by the behavior information collection unit by using a position detector (not shown) of Global Positioning System (GPS) installed in the information receiving device 10. For example, the merchandise information representing the purchase behavior may be information collected by the behavior information collection unit on the basis of information viewing history of an information viewer unit (not shown) of a web browser installed in the information receiving device 10. Thus, the actual behavior information of the user is not limited provided that the information represents the user's actual behavior. The behavior information collection unit may store the collected actual behavior information in the storage device 1004.

The "pseudo behavior information" is the information that does not represent the user's actual behavior. For example, the request information generation unit 11 may designate behavior information randomly extracted from a universal set of the behavior information that is assumed to be generated as pseudo behavior information. The universal set of the behavior information may be stored in the information receiving device 10 (for example, storage device 1004) in advance. Alternatively, the universal set of the behavior information may be acquired from a non-illustrated external device. The pseudo behavior information is information generated in order to maintain the confidentiality of information representing the user's behavior and the tendency thereof, and to protect the privacy of the user.

The request information generation unit 11 should include one or more elements of actual behavior information and one or more elements of pseudo behavior information in the request information. The number of elements of each type of behavior information included in the request information is not limited.

The distribution information request unit 12 transmits the request information received from the request information generation unit 11 to the information distribution device 90.

For example, first, the distribution information request unit 12 acquires the actual behavior information to be transmitted from the above-mentioned behavior information collection unit or the storage device 1004 in order to request the associated distribution information. Then, the distribution information request unit 12 outputs the acquired actual behavior information to the request information generation unit 11.

Then, the request information generation unit 11 outputs the request information including the actual behavior information and the pseudo behavior information, to the distribution information request unit 12.

The distribution information request unit 12 transmits the request information outputted from the request information generation unit 11, to the information distribution device 90.

In this case, for example, the distribution information request unit 12 may acquire the behavior information to be transmitted out of the actual behavior information stored in the storage device 1004 on the basis of the information inputted in the input device 1006, as actual behavior information to be transmitted. Alternatively, the distribution information request unit 12 may acquire the actual behavior information newly collected by the behavior information collection unit at the time to be collected, as actual behavior information to be transmitted. Furthermore, the distribution information request unit 12 may acquire the actual behavior information to be transmitted on the basis of an input from another device or an input from another non-illustrated functional block included in the information receiving device 10.

The distribution information request unit 12 may transmit each element of behavior information included in the request information outputted from the request information generation unit 11 separately (for example, one by one) to the information distribution device 90.

The distribution information request unit 12 also receives information distributed from the information distribution device 90 on the basis of the transmitted request information, in other words the distribution information.

More specifically, the distribution information request unit 12 receives a set of the distribution information associated with each element of behavior information (actual behavior information and pseudo behavior information) included in the transmitted request information. In the case of separately transmitting each element of behavior information included in the request information, the distribution information request unit 12 should separately receive the distribution information associated with the behavior information that has been separately transmitted.

The distribution information selection unit 13 selects the distribution information associated with the actual behavior information out of the distribution information received by the distribution information request unit 12.

It will be assumed that, for example, the set of the received distribution information is composed of a combination of the behavior information and the distribution information. In this case, the distribution information selection unit 13 should select the distribution information associated with the actual behavior information included in the transmitted request information, out of the set of the distribution information that has been returned.

For example, it will be assumed that each element of behavior information included in the request information is separately transmitted and the associated distribution information is separately received. In this case, the distribution information selection unit 13 may associate each element of behavior information included in the request information with the distribution information received as response to the transmission of the behavior information. The distribution information selection unit 13 should select the distribution information associated with the actual behavior information.

In addition, the distribution information selection unit 13 may output the selected distribution information to the output device 1007.

Hereunder, the function of the information distribution device 90 will be described.

The information distribution device 90 receives the request information transmitted from the information receiving device 10. The information distribution device 90 then returns the set of the distribution information based on the received request information, to the information receiving device 10 that has transmitted the request information.

For example, the information distribution device 90 may accumulate the distribution information, and select the distribution information associated with the behavior information included in the received request information out of the accumulated distribution information. When the behavior information included in the request information is separately transmitted from the information receiving device 10, the information distribution device 90 may select the distribution information associated with the received behavior information, and return the selected distribution information to the information receiving device 10. Various known techniques of selecting the distribution information associated with the behavior information may be adopted for the information distribution device 90.

Figure 3:
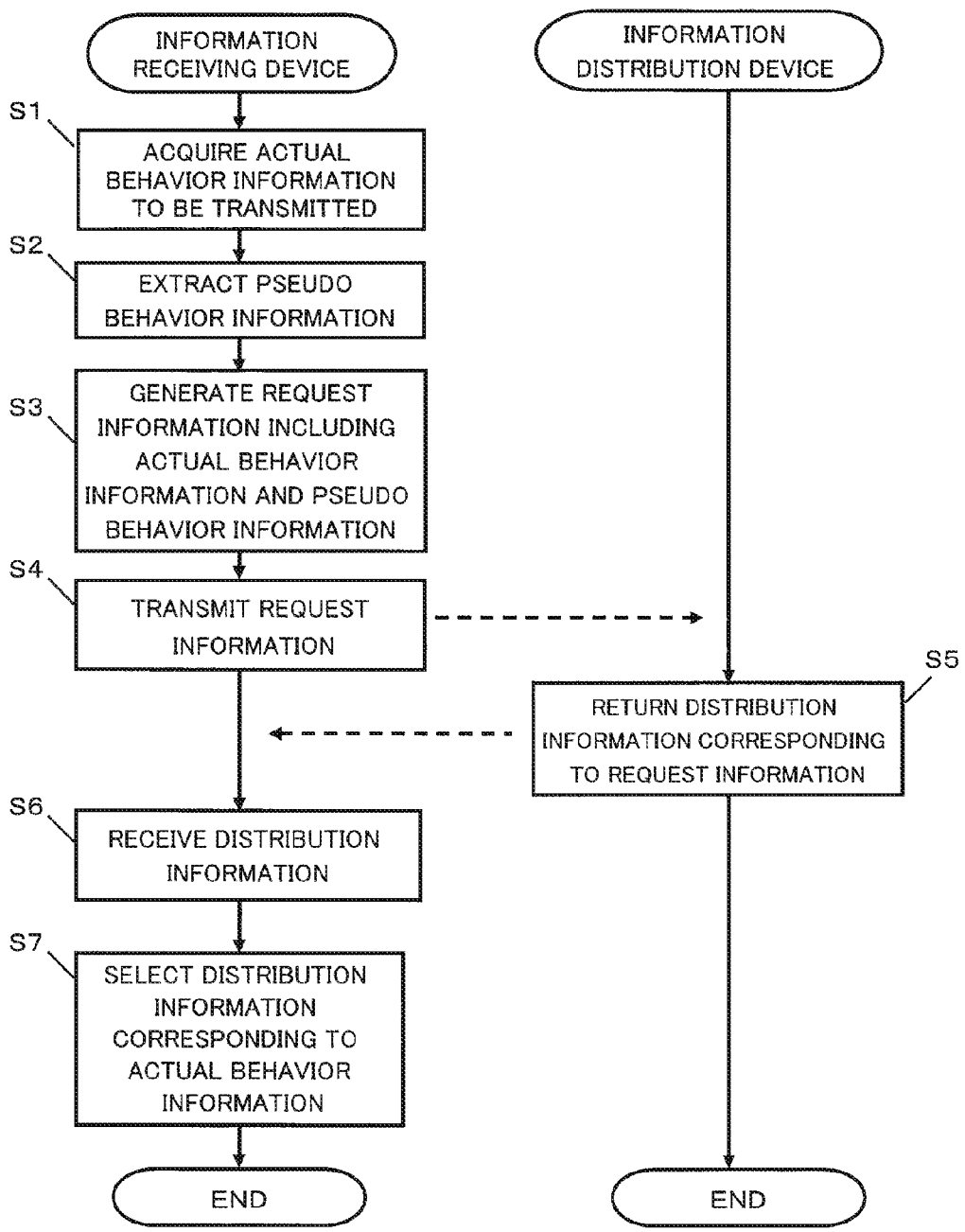
FIG. 3 is a flowchart for explaining an operation of the information receiving system according to the first exemplary embodiment of the present invention.

An operation of the information receiving system 1 configured as above will be described by referring FIG. 3. In FIG. 3, the left-hand chart represents the operation of the information receiving device 10, and the right-hand chart represents the operation of the information distribution device 90. Broken line arrows connecting between the left and right charts indicate flow of data.

First, the distribution information request unit 12 of the information receiving device 10 acquires the actual behavior information to be transmitted (Step S1).

Then, the request information generation unit 11 extracts the pseudo behavior information (Step S2). For example, the request information generation unit 11 may randomly extract the pseudo behavior information out of the universal set of the behavior information that is assumed to be generated, as above-mentioned.

Then, the request information generation unit 11 generates the request information including the actual behavior information acquired at Step S1 and the pseudo behavior information extracted at Step S2 (Step S3).

Then, the distribution information request unit 12 transmits the request information generated at Step S3 to the information distribution device 90 (Step S4).

The information distribution device 90 receives the request information, and returns the set of the distribution information associated with the behavior information included in the received request information (Step S5).

The distribution information request unit 12 of the information receiving device 10 receives the set of the distribution information (Step S6).

Then, the distribution information selection unit 13 selects the distribution information associated with the actual behavior information acquired at Step S1 out of the received set of the distribution information, and outputs the selected distribution information (Step S7).

Upon completing Step S7, the information receiving system 1 finishes the operation.

Advantageous effects of the first exemplary embodiment of the present invention will be described hereunder.

The information receiving system 1 according to the first exemplary embodiment of the present invention is capable of presenting the distribution information more appropriate for the user while protecting the privacy information representing the behavior of the user and the tendency thereof.

Reasons of the above are as follows.

The request information generation unit 11 of the information receiving device 10 generates the request information as a mixture of the actual behavior information and the pseudo behavior information. The distribution information request unit 12 transmits the request information thus generated to the information distribution device 90. The distribution information request unit 12 then receives the distribution information associated with the transmitted request information. Then, the distribution information selection unit 13 selects the information associated with the actual behavior information, out of the received distribution information.

The information distribution device 90 is unable to specify which element of information represents the actual behavior information of the user, in the request information that has been received. In addition, the information distribution device 90 is unable to correctly analyze the tendency of the user's behavior, by accumulating the request information in which the pseudo behavior information is mixed. Accordingly, this exemplary embodiment can hide the privacy information representing the behavior of the user and the tendency thereof from the service provider operating the information distribution device 90. In addition, the information receiving device 10 according to this exemplary embodiment can properly select the distribution information associated with the actual behavior information of the user, and can therefore present the distribution information more appropriate for the user.

Second Exemplary Embodiment

A second exemplary embodiment of the present invention will be described in details, with reference to the drawings. In the drawings referred to for the description of this exemplary embodiment, the same constituents and Steps as those of the first exemplary embodiment of the present invention will be given the same numeral, and the description thereof will not be omitted.

Figure 4:
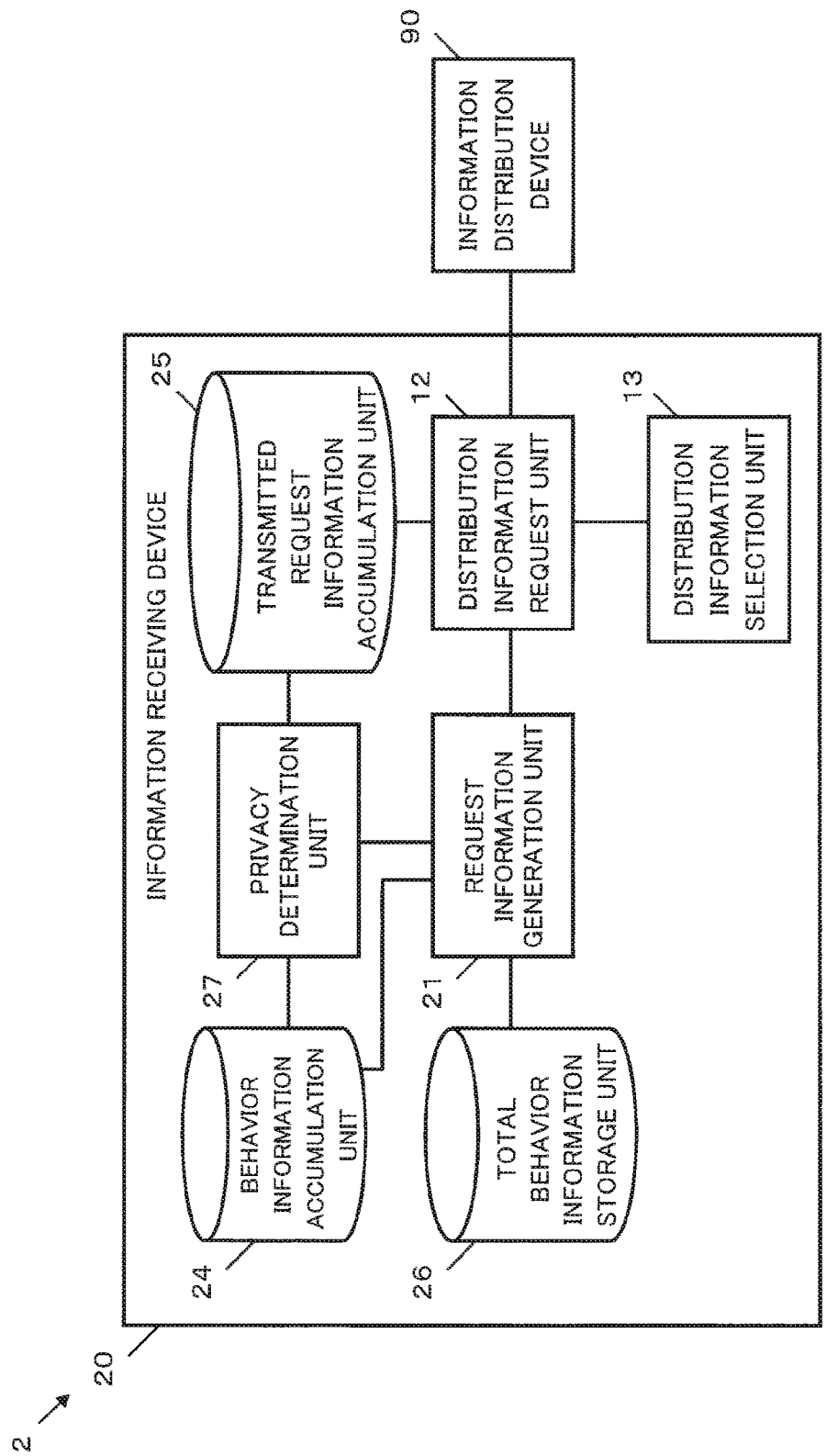
FIG. 4 is a functional block diagram of an information receiving system according to a second exemplary embodiment of the present invention.

FIG. 4 illustrates configuration of a functional block of an information receiving system 2 according to the second exemplary embodiment of the present invention. In FIG. 4, the information receiving system 2 is different from the information receiving system 1 according to the first exemplary embodiment of the present invention, in including an information receiving device 20 in place of the information receiving device 10. Furthermore, the information receiving device 20 is different from the information receiving device 10 according to the first exemplary embodiment of the present invention, in including a request information generation unit 21 in place of the request information generation unit 11. Furthermore, the information receiving device 20 is different from the information receiving device 10 according to the first exemplary embodiment of the present invention, in including a behavior information accumulation unit 24, a transmitted request information accumulation unit 25, a total behavior information storage unit 26, and a privacy determination unit 27.

The information receiving device 20 may be constituted of a computer device including the hardware elements described with reference to FIG. 2, like the information receiving device 10 according to the first exemplary embodiment of the present invention. In the configuration shown in FIG. 2, the behavior information accumulation unit 24, the transmitted request information accumulation unit 25, and the total behavior information storage unit 26 are realized by using the storage device 1004. The privacy determination unit 27 is realized by using the CPU 1001 that reads the computer program and various data stored in the ROM 1003 and/or the storage device 1004 into the RAM 1002, and executes the computer program. The hardware configuration of the information receiving device 20 and each functional block thereof are not limited to the above description.

Hereunder, each of the functional blocks of the information receiving device 20 will be described in details.

The behavior information accumulation unit 24 accumulates the actual behavior information of the user. The behavior information accumulation unit 24 accumulates the actual behavior information in association with attribute information representing the attribute of the behavior information. Hereinafter, the set of the behavior information accumulated in the behavior information accumulation unit 24 may also be referred to as "actual behavior information set".

The transmitted request information accumulation unit 25 accumulates the behavior information included in the request information transmitted to the information distribution device 90. The transmitted request information accumulation unit 25 accumulates the behavior information included in the transmitted request information in association with the attribute information representing the attribute of the behavior information. Hereinafter, the set of the behavior information accumulated in the transmitted request information accumulation unit 25 may also be referred to as "transmitted behavior information set".

The total behavior information storage unit 26 stores the behavior information that is assumed to be generated. The total behavior information storage unit 26 stores the behavior information that is assumed to be generated in association with the attribute information representing the attribute of the behavior information. Hereinafter, the set of the behavior information stored in the total behavior information storage unit 26 may also be referred to as "behavior information universal set".

The privacy determination unit 27 determines whether or not a candidate of the request information contains privacy specific possibility, on the basis of actual behavior tendency information and predicted behavior tendency information.

The "actual behavior tendency information" is the information representing the tendency of the actual behavior information set.

The "predicted behavior tendency information" is the information representing the tendency of the predicted behavior information set.

The "predicted behavior information set" is the set of behavior information to be accumulated in the information distribution device 90 when it is assumed that the candidate request information is transmitted to the information distribution device 90. In other words, the predicted behavior information set is a set formed by adding the behavior information included in the candidate request information to the transmitted behavior information set.

The "privacy specific possibility" is the possibility in that the actual behavior of the user and the tendency thereof is specified when it is assumed that the candidate request information is transmitted to the information distribution device 90. For example, the privacy determination unit 27 may calculate a coincidental degree between the actual behavior tendency information and the predicted behavior tendency information, and determine whether or not the candidate request information contains privacy specific possibility depending on whether the coincidental degree is equal to or higher than a threshold.

The privacy determination unit 27 may generate information representing the tendency of the attribute of the behavior information included in the associated behavior information set, as behavior tendency information. For example, the privacy determination unit 27 may generate information representing the frequency distribution of the attribute of the behavior information included in the associated behavior information set, as behavior tendency information. Alternatively, the privacy determination unit 27 may generate a set of the attribute information extracted on the basis of the above-mentioned frequency distribution, as behavior tendency information. For example, the privacy determination unit 27 may generate a set including a predetermined number of elements of the attribute information according to the order of frequency of the attribute information, as behavior tendency information.

In the case of generating the set of the attribute information as behavior tendency information, the privacy determination unit 27 may determine the privacy specific possibility on the basis of the attribute information common to both of the actual behavior tendency information and the predicted behavior tendency information. For example, the privacy determination unit 27 may calculate, as the coincidental degree, a ratio of the number of elements of the common attribute information with respect to the number of elements of the predicted behavior tendency information. Then, the privacy determination unit 27 may determine that there is the privacy specific possibility with the predicted behavior information when the coincidental degree is equal to or higher than a predetermined threshold, and determine that there is no privacy specific possibility when the coincidental degree is lower than the predetermined threshold.

The request information generation unit 21 generates the set of the pseudo behavior information to be included in the request information, so that the privacy determination unit 27 determines that there is no privacy specific possibility.

Concretely, for example, the request information generation unit 21 should operate as follows. The request information generation unit 21 generates the candidate request information. Then, the request information generation unit 21 determines the privacy specific possibility of the request information generated by using the privacy determination unit 27. Then, the request information generation unit 21 should adopt the candidate which is determined that there is no privacy specific possibility, as request information.

Furthermore, for example, the request information generation unit 21 may generate the set of the pseudo behavior information by sequentially adding the pseudo behavior information until it is determined that there is no privacy specific possibility. In this case, the request information generation unit 21 may select the pseudo behavior information to be sequentially added out of the behavior information universal set stored in the total behavior information storage unit 26, on the basis of an evaluation value to be subsequently described.

For example, the request information generation unit 21 may randomly extract a predetermined number of elements of the behavior information out of the universal set as candidate of the pseudo behavior information, and select the pseudo behavior information to be added on the basis of the evaluation value of each of the extracted candidates. Concretely, the request information generation unit 21 generates the predicted behavior information set including a tentative set of the pseudo behavior information to which the candidates of the pseudo behavior information have been added, the actual behavior information to be transmitted, and the transmitted behavior information set. Then, the request information generation unit 21 may calculate the evaluation value of the predicted behavior information set including each of the candidates, on the basis of the variation of the information indicating the privacy specific possibility with respect to the transmitted behavior information set.

For example, it is assumed that the frequency distribution of the attribute information in the behavior information set is adopted as information indicating the privacy specific possibility.

In this case, the request information generation unit 21 has calculated the frequency distribution of the attribute information with respect to the transmitted behavior information set. Hereinafter, the frequency distribution of the attribute information of the transmitted behavior information set will be referred to as "transmitted attribute frequency distribution".

The request information generation unit 21 calculates the frequency distribution of the each attribute information with respect to the predicted behavior information set in the case including each of the candidates of the pseudo behavior information. Hereinafter, the frequency distribution of the attribute information of each of the predicted behavior information sets will be referred to as "predicted attribute frequency distribution".

The request information generation unit 21 utilizes a varied value of the frequency of each element of the attribute information indicated by the predicted attribute frequency distribution, in other words the varied value from the frequency indicated by the transmitted attribute frequency distribution. Then, the request information generation unit 21 may calculate the sum of the varied value aggregated according to a predetermined condition, as evaluation value.

The sum aggregated according to a predetermined condition is a sum as the following, for example.

The request information generation unit 21 calculates the sum of the decline in frequency with respect to the attribute information included in the actual behavior tendency information out of the attribute information included in the predicted attribute frequency distribution. The request information generation unit 21 calculates the sum of the increase in frequency of the remaining attribute information, with weighting. As the weight, for example, the request information generation unit 21 may apply a greater weight to the attribute information of a higher frequency in the transmitted attribute frequency distribution, among the attribute information not included in the actual behavior tendency information.

Accordingly, it is desirable that the request information generation unit 21 adopts a calculation method of the evaluation value as follows. Namely, the calculation method is a calculation method such that the evaluation value becomes higher, the lower the specific possibility of the attribute information closely related to the user's actual behavior is, in the predicted behavior information set to which it is assumed that the candidates of the pseudo behavior information have been added. The request information generation unit 21 may adopt not only the above-mentioned calculation method but also other calculation methods of the evaluation value like that the calculation method provides the mentioned result.

Then, the request information generation unit 21 may select the candidate on the basis of the above-mentioned evaluation value calculated on the assumption that the candidate has been added, with respect to each of the candidates of the pseudo behavior information, and add the selected candidate to the tentative set of the pseudo behavior information. For example, the request information generation unit 21 should select the candidate that has the highest evaluation value among the candidates of the pseudo behavior information, and add the selected candidate to the tentative set of the pseudo behavior information.

An operation of the information receiving system 2 configured as above will be described with reference to the drawings.

Figure 5:
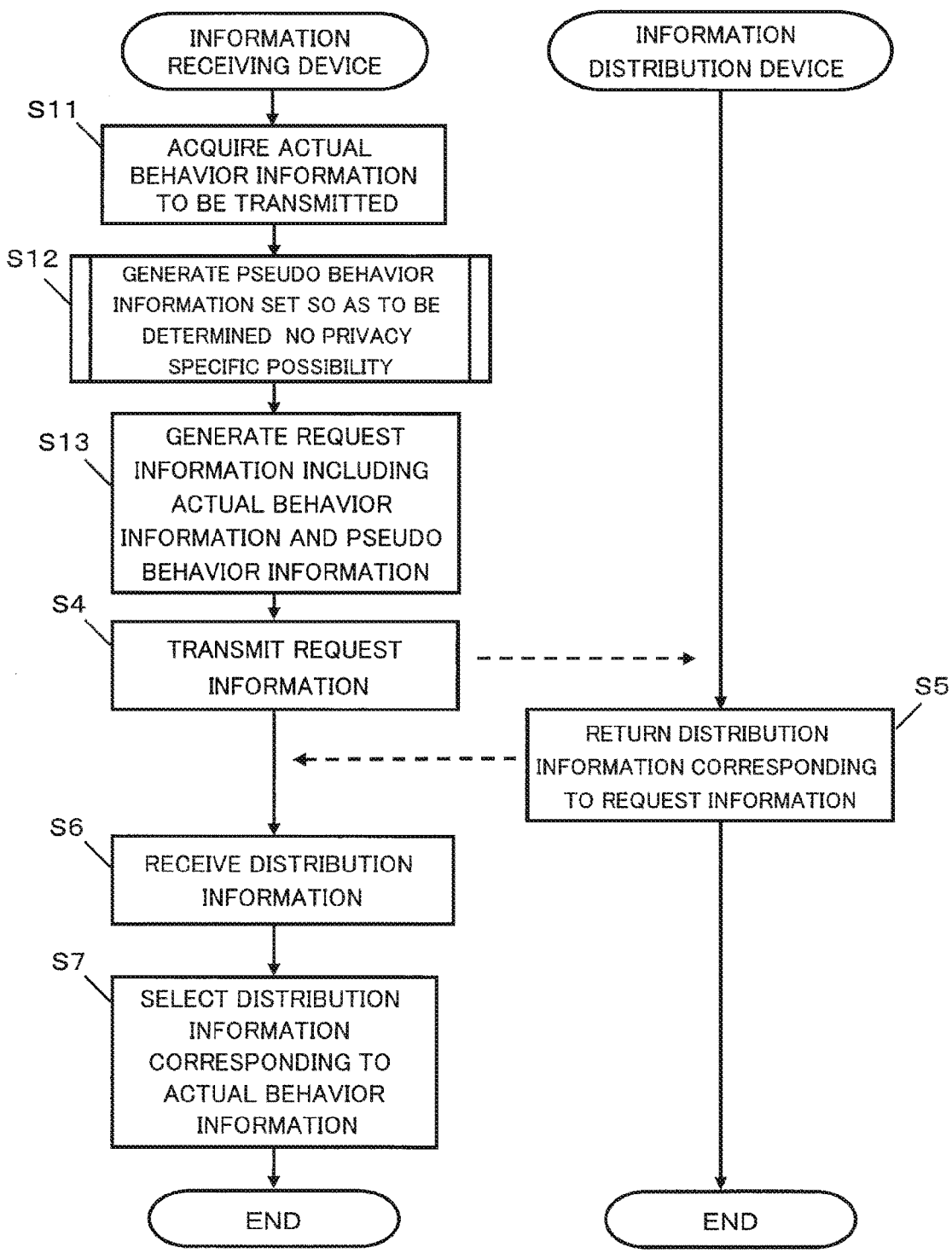
FIG. 5 is a flowchart for explaining an outline of an operation of the information receiving system according to the second exemplary embodiment of the present invention.

FIG. 5 illustrates an outline of the operation of the information receiving system 2.

In FIG. 5, first, the distribution information request unit 12 acquires the actual behavior information to be transmitted (Step S11). For example, the distribution information request unit 12 may select the behavior information to be transmitted out of the behavior information accumulation unit 24.

Thereafter, the request information generation unit 21 generates a set of the pseudo behavior information to be included in the request information, such that it is determined that there is no privacy specific possibility in the following case (Step S12). The case is where it is assumed that the request information including the actual behavior information acquired at Step S11 is transmitted to the information distribution device 90. Further details of this Step will be subsequently described.

Then, the distribution information request unit 12 generates the request information including the actual behavior information acquired at Step S11, and the pseudo behavior information generated at Step S12 (Step S13).

Thereafter, the information receiving system 2 performs the operation from Step S4 to S7 in FIG. 3, in the same way as the information receiving system 1 according to the first exemplary embodiment of the present invention. On the basis of such operation, the information receiving system 2 receives the set of the distribution information associated with the request information transmitted at Step S13, selects the distribution information associated with the actual behavior information acquired at Step S11 out of the received set of the distribution information, and outputs the distribution information.

The outline of the operation of the information receiving system 2 is as described above.

Figure 6:
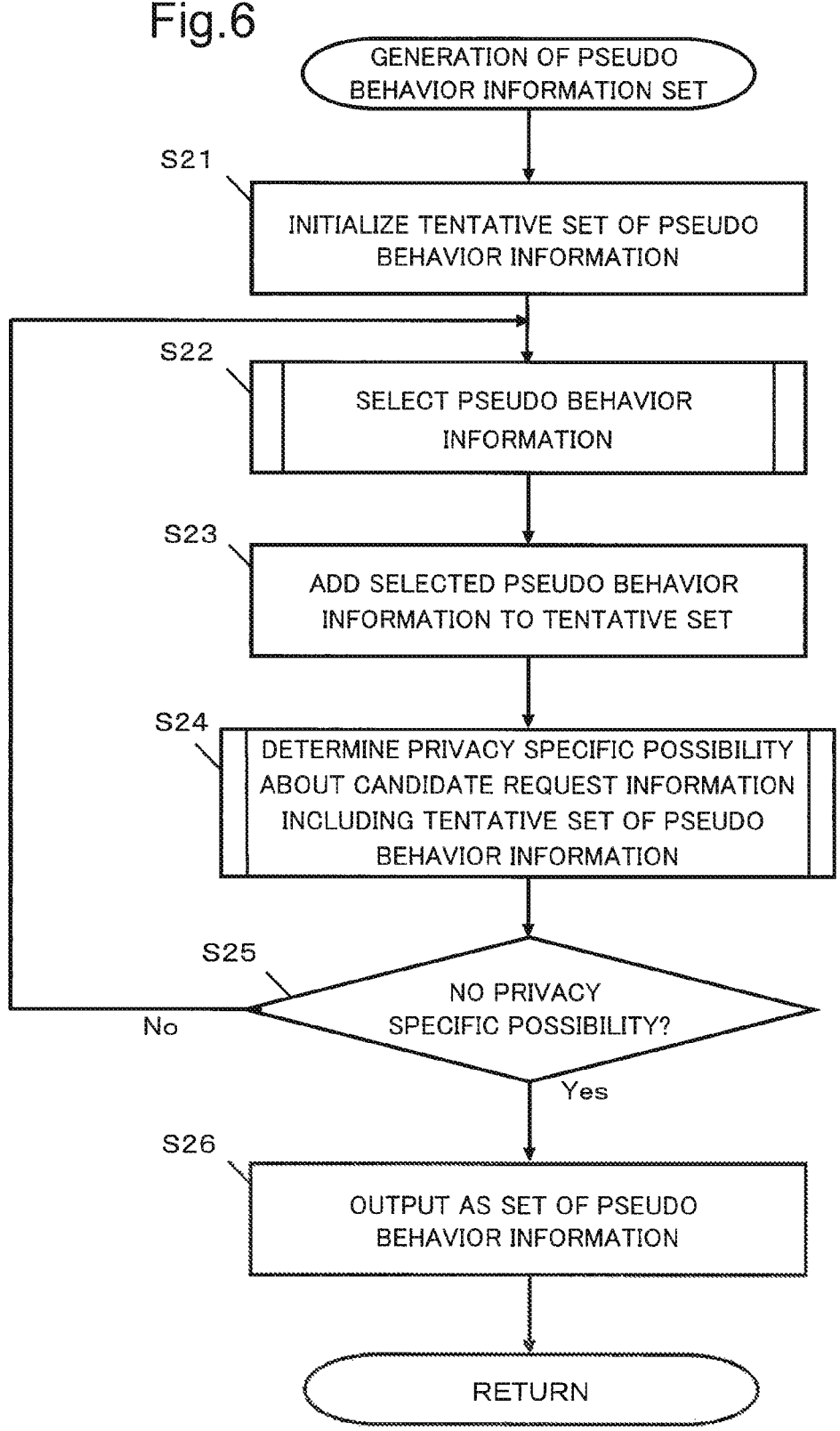
FIG. 6 is a flowchart for explaining a generation process of a pseudo behavior information set performed by the information receiving system according to the second exemplary embodiment of the present invention.

FIG. 6 illustrates a detailed generation process of a set of the pseudo behavior information performed at Step S12.

In FIG. 6, first, the request information generation unit 21 initializes the tentative set of the pseudo behavior information. In other words, the request information generation unit 21 generates an empty set, and utilizes the empty set as initialized tentative set of the pseudo behavior information (Step S21).

Then, the request information generation unit 21 selects the pseudo behavior information to be added to the tentative set (Step S22). For example, the request information generation unit 21 may randomly select the pseudo behavior information to be added to the tentative set out of the universal set of the behavior information. Alternatively, the request information generation unit 21 may select the pseudo behavior information to be added to the tentative set out of the universal set of the behavior information on the basis of a certain index. For example, the request information generation unit 21 may select the pseudo behavior information to be added on the basis of the above-mentioned evaluation value. Further details of the operation at this Step will be subsequently described.

Then, the request information generation unit 21 adds the pseudo behavior information selected at Step S22 to the tentative set of the pseudo behavior information (Step S23).

Then, the request information generation unit 21 determines the privacy specific possibility of the candidate request information including the tentative set of the pseudo behavior information generated at Step S23 (Step S24). Further details of the operation at this Step will be subsequently described.

Then, the request information generation unit 21 determines whether or not it is determined that there is no privacy specific possibility at Step S24 (Step S25).

In the case where it is determined that there is privacy specific possibility, the request information generation unit 21 repeats the operation from Step S22.

In contrast, in the case where it is determined that there is no privacy specific possibility at Step S25, the request information generation unit 21 outputs the tentative set of the pseudo behavior information as set of the pseudo behavior information (Step S26).

The description of generation process of the set of the pseudo behavior information is completed as described above.

Figure 7:
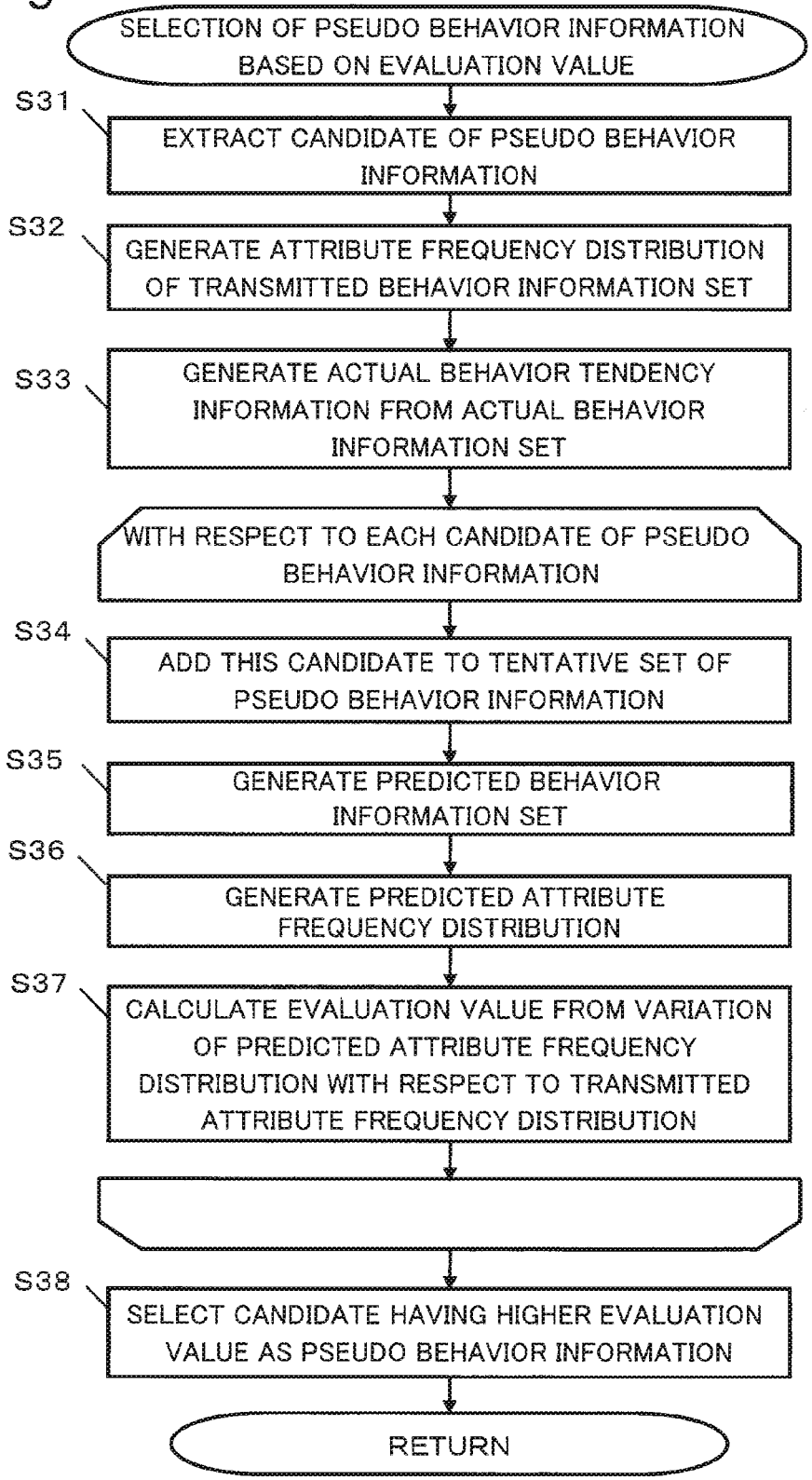
FIG. 7 is a flowchart for explaining a selection process of the pseudo behavior information performed by the information receiving system according to the second exemplary embodiment of the present invention.

Then, FIG. 7 illustrates a selection process of the pseudo behavior information based on the evaluation value, as an example of the operation of Step S22.

In FIG. 7, first, the request information generation unit 21 extracts a candidate of the pseudo behavior information out of the universal set of the behavior information stored in the total behavior information storage unit 26 (Step S31). For example, the request information generation unit 21 may randomly extract a predetermined number of elements of the behavior information out of the universal set of the behavior information, as candidate of the pseudo behavior information.

Then, the request information generation unit 21 generates the transmitted attribute frequency distribution representing the frequency distribution of the attribute information with respect to the transmitted behavior information set accumulated in the transmitted request information accumulation unit 25 (Step S32).

Then, the request information generation unit 21 generates the actual behavior tendency information on the basis of the actual behavior information set accumulated in the behavior information accumulation unit 24 (Step S33). For example, the request information generation unit 21 may generate a set including a predetermined number of elements of the attribute information from the high-ranking of the frequency among attribute information of the actual behavior information accumulated in the behavior information accumulation unit 24, as actual behavior tendency information.

Then, the request information generation unit 21 repeats the operation from Step S34 to S37, with respect to each of the candidates of the pseudo behavior information extracted at Step S31.

In this process, first, the request information generation unit 21 tentatively adds the candidate of the pseudo behavior information to the tentative set of the pseudo behavior information formed at this point (Step S34).

Then, the request information generation unit 21 generates the predicted behavior information set including the tentative set of the pseudo behavior information to which the candidate of the pseudo behavior information has been tentatively added, the actual behavior information to be transmitted, and the transmitted behavior information set (Step S35).

Then, the request information generation unit 21 generates the predicted attribute frequency distribution representing the frequency distribution of the attribute information, with respect to the predicted behavior information set (Step S36).

Then, the request information generation unit 21 calculates the evaluation value based on the variation of the predicted attribute frequency distribution with respect to the transmitted attribute frequency distribution (Step S37). Concretely, the request information generation unit 21 calculates the sum of the declines from the frequency in the transmitted attribute frequency distribution with respect to the attribute information included in the actual behavior tendency information among the attribute information representing the predicted attribute frequency distribution. The request information generation unit 21 also calculates the sum of the increase with respect to the remaining attribute information, with weighting. Then, the request information generation unit 21 calculates the total value of each of the mentioned sums, as evaluation value.

Upon completing the operation from Step S34 to S37 with respect to all the candidates of the pseudo behavior information extracted at Step S33, the request information generation unit 21 selects the candidate of the pseudo behavior information on the basis of the evaluation value (Step S38). For example, the request information generation unit 21 may select the candidate that has the highest evaluation value.

The description of selection process of the pseudo behavior information based on the evaluation value is completed as described above.

FIG. 8 illustrates the details of the privacy determination process of Step S24.

In FIG. 8, first, the privacy determination unit 27 generates the actual behavior tendency information representing the tendency of the actual behavior information set accumulated in the behavior information accumulation unit 24 (Step S41). For example, the privacy determination unit 27 may generate the set of the attribute information referred to above, as actual behavior tendency information.

Then, the privacy determination unit 27 generates the predicted behavior information set (Step S42). Here, the predicted behavior information set includes the transmitted behavior information set accumulated in the transmitted request information accumulation unit 25, the tentative set of the pseudo behavior information generated at Step S23, and the actual behavior information to be transmitted acquired at Step S11. The predicted behavior information set represents the set of the behavior information to be accumulated in the information distribution device 90 when it is assumed that the candidate request information including the actual behavior information to be transmitted and the tentative set of the pseudo behavior information is transmitted to the information distribution device 90.

Then, the privacy determination unit 27 generates the predicted behavior tendency information representing the tendency of the predicted behavior information set generated at Step S42 (Step S43). For example, the privacy determination unit 27 may generate the set of the attribute information referred to above, as predicted behavior tendency information.

Then, the privacy determination unit 27 calculates the coincidental degree between the actual behavior tendency information generated at Step S41 and the predicted behavior tendency information generated at Step S43 (Step S44). For example, the privacy determination unit 27 may calculate, as described earlier, the ratio of the number of elements of the attribute information that are common to the actual behavior tendency information and the predicted behavior tendency information, as the coincidental degree.

Then, the privacy determination unit 27 determines whether or not the coincidental degree calculated at Step S41 is equal to or higher than a predetermined threshold (Step S45).

In the case where the coincidental degree is lower than the predetermined threshold, the privacy determination unit 27 determines that there is no privacy specific possibility (Step S46).

In contrast, in the case where the coincidental degree is equal to or higher than the predetermined threshold, the privacy determination unit 27 determines that there is privacy specific possibility (Step S47).

The description of privacy determination process is completed as described above.

Hereunder, the operation of the information receiving system 2 will be described with reference to examples of concrete data.

FIG. 9 illustrates an actual behavior information set accumulated in the behavior information accumulation unit 24 in this concrete example. In FIG. 9, each column of the actual behavior information set represents the actual behavior information and the attribute information of the actual behavior information. Here, the behavior information is merchandise information representing the merchandise purchase behavior of the user. The attribute information represents the category of the merchandise.

FIG. 10 illustrates an example of the transmitted behavior information set accumulated in the transmitted request information accumulation unit 25. In FIG. 10, each column of the transmitted behavior information set represents the transmitted behavior information and the associated attribute information. The behavior information is information included in the request information already transmitted to the information distribution device 90.

FIG. 11 illustrates an example of the universal set of the behavior information stored in the total behavior information storage unit 26. In FIG. 11, each column of the universal set of the behavior information represents the behavior information assumed to be generated and the associated attribute information.

First, it is assumed that the distribution information request unit 12 of the information receiving device 20 has acquired the behavior information representing "merchandise X" out of the actual behavior information set shown in FIG. 9, as actual behavior information to be transmitted (Step S11 in FIG. 5).

Then, the request information generation unit 21 builds up a set of the pseudo behavior information such that it is determined that there is no privacy specific possibility with respect to the request information including the actual behavior information "merchandise X" (Step S12).

To be more detailed, the request information generation unit 21 first initializes the tentative set of the pseudo behavior information (Step S21 in FIG. 6). Then, the request information generation unit 21 sequentially selects the pseudo behavior information to be added to the tentative set of the pseudo behavior information, as described hereunder.

First, the request information generation unit 21 extracts the candidate of the pseudo behavior information out of the universal set of the behavior information shown in FIG. 11 (Step S31 in FIG. 7). Here, it is assumed that, as shown in FIG. 11, the request information generation unit 21 has extracted "merchandise V", "merchandise W", and "merchandise Y", as three candidates of the pseudo behavior information.

Then, the request information generation unit 21 generates the transmitted attribute frequency distribution with respect to the transmitted behavior information set shown in FIG. 10 (Step S32).

Here, it is assumed that the request information generation unit 21 calculates the attribute frequency distribution as described below.

The request information generation unit 21 calculates the sum of the number of times of occurrence with respect to each of attribute information included in the all behavior information included in the associated behavior information set. Then, the request information generation unit 21 normalizes the number of times of occurrence by using the sum of the number of times of occurrence, so that the overall occurrence probability becomes 1, and calculates the frequency distribution. In this process, the request information generation unit 21 makes "1/number of elements of attribute information of the behavior information" ("/" represents division) the number of times of occurrence, with respect to the behavior information including a plurality of elements of attribute information. The calculation method of the attribute frequency distribution used by the request information generation unit 21 does not need to be limited to the above method.

Here, it is assumed that the transmitted attribute frequency distribution shown in FIG. 10 is obtained through the foregoing operation.

Then, the request information generation unit 21 extracts the attribute information of higher frequency out of the attribute information of the actual behavior information set shown in FIG. 9, as actual behavior tendency information (Step S33). Here, it is assumed that the actual behavior tendency information shown in FIG. 9 is obtained as five high-ranking attribute information in order to large frequency.

Then, the request information generation unit 21 repeats the operation from Step S34 to S37, with respect to "merchandise V", "merchandise W", and "merchandise Y" which are the candidates of the pseudo behavior information.

First, the operation related to the candidate of the pseudo behavior information "merchandise V" will be described.

The request information generation unit 21 tentatively adds the candidate of the pseudo behavior information "merchandise V" to the empty set { }, which is the tentative set of the pseudo behavior information (Step S34). As a result, {"merchandise V" } is obtained as candidate for the tentative set of the pseudo behavior information.

Then, the request information generation unit 21 generates the predicted behavior information set including the candidate {"merchandise V"} for the tentative set of the pseudo behavior information, the actual behavior information to be transmitted "merchandise X", and the transmitted behavior information set shown in FIG. 10 (Step S35). As result of above operation, the predicted behavior information set shown in FIG. 10 is obtained.

Then, the request information generation unit 21 generates the predicted attribute frequency distribution representing the frequency distribution of the attribute information, with respect to the predicted behavior information set (Step S36). Here, it is assumed that the predicted attribute frequency distribution shown in FIG. 10 is obtained.

Then, the request information generation unit 21 calculates the evaluation value representing the variation of the predicted attribute frequency distribution with respect to the transmitted attribute frequency distribution shown in FIG. 10 (Step S37).

To be more detailed, the request information generation unit 21 calculates, as described earlier, the sum of the decline in frequency included in the predicted attribute frequency distribution from the frequency in the transmitted attribute frequency distribution shown in FIG. 10, with respect to the attribute information included in the actual behavior tendency information shown in FIG. 9.

The request information generation unit 21 also calculates the sum of the increase in frequency with weighting, with respect to the attribute information not included in the actual behavior tendency information. Then, the request information generation unit 21 calculates the total values of the mentioned sums, as evaluation value. Hereunder, the request information generation unit 21 applies the weight "1.0" to the four high-ranking elements of attribute information in the transmitted attribute frequency distribution shown in FIG. 10, among the attribute information not included in the actual behavior tendency information. In addition, the request information generation unit 21 applies the weight "0.5" to the attribute information of lower frequency than above frequency.

For example, in FIG. 10, solid lines connecting between the transmitted attribute frequency distribution and the predicted attribute frequency distribution represent the calculation of the decline in frequency. Broken lines represent the calculation of the increase in frequency (weight 1). A dash-dot line represents the calculation of the increase in frequency (weight 0.5).

Then, the request information generation unit 21 calculates the total value of the mentioned sums, as evaluation value.

Through the mentioned operation, the request information generation unit 21 calculates the evaluation value "−0.00700" with respect to the candidate of the pseudo behavior information "merchandise V", as shown in FIG. 12. Likewise, the request information generation unit 21 calculates the evaluation value "−0.02255" with respect to the candidate of the pseudo behavior information "merchandise W", and calculates the evaluation value "−0.01294" with respect to the candidate of the pseudo behavior information "merchandise Y".

Then, the request information generation unit 21 selects the "merchandise V", which has the highest evaluation value among the candidates of the pseudo behavior information (Step S38).

Then, the request information generation unit 21 adds the selected candidate of the pseudo behavior information "merchandise V" to the tentative set of the pseudo behavior information, and generates the tentative set of the pseudo behavior information {"merchandise V" } (Step S23).

Then, the request information generation unit 21 determines the privacy specific possibility of the candidate request information including the tentative set of the pseudo behavior information generated at Step S23 by using the privacy determination unit 27 (Step S24).

To be more detailed, first, the privacy determination unit 27 generates the actual behavior tendency information representing the tendency of the actual behavior information shown in FIG. 9 (Step S41). Here, it is assumed that the set of the attribute information shown in FIG. 9 is obtained as actual behavior tendency information.

Figure 13:
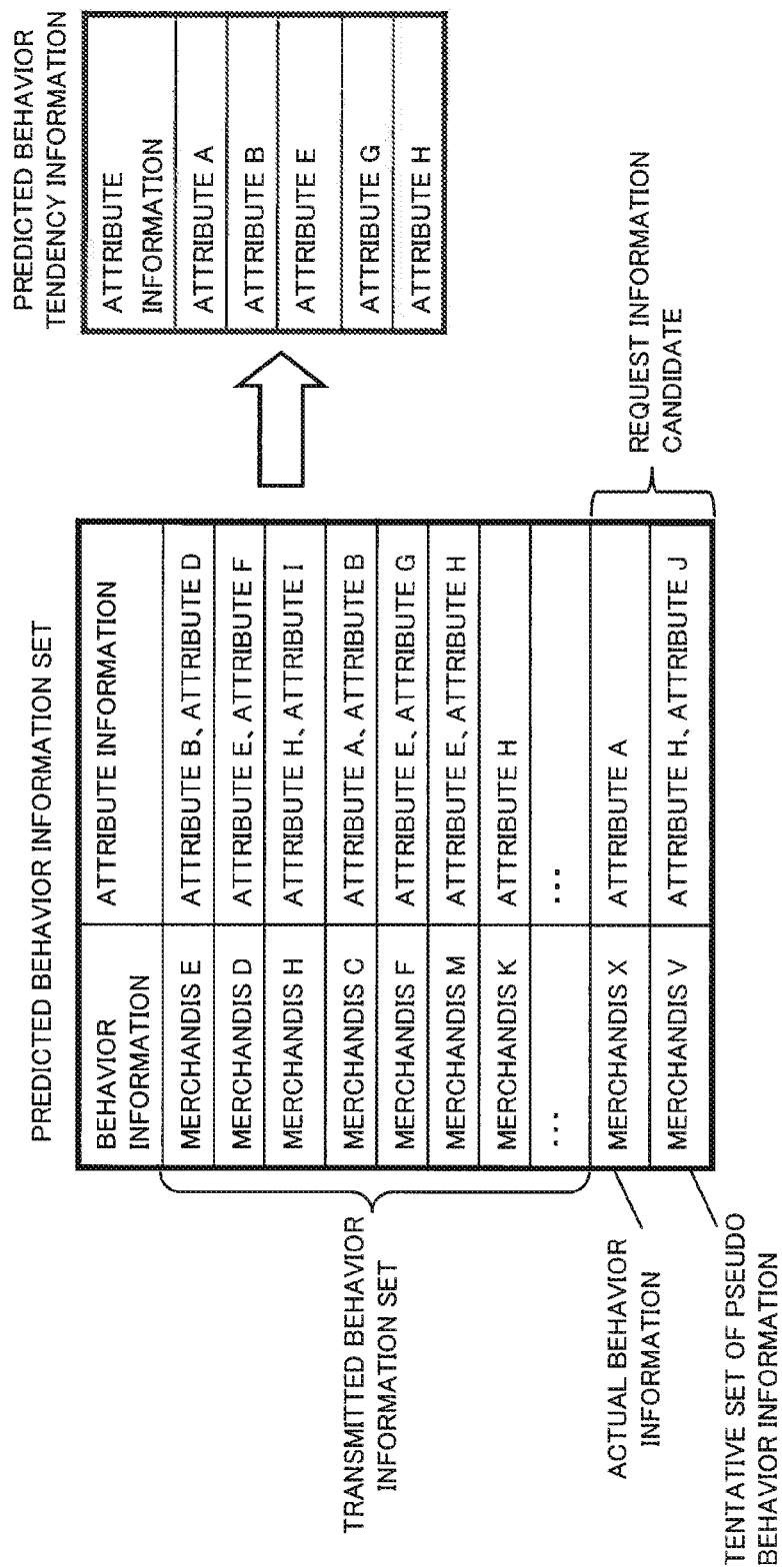
FIG. 13 is a figure showing an example of the predicted behavior information set and predicted behavior tendency information according to the second exemplary embodiment of the present invention.

Then, the privacy determination unit 27 generates the behavior information set (Step S42). The behavior information set includes the transmitted behavior information set shown in FIG. 10, the tentative set of the pseudo behavior information {"merchandise V" } generated at Step S23, and the actual behavior information to be transmitted "merchandise X" acquired at Step S11. Here, it is assumed that the predicted behavior information set shown in FIG. 13 is obtained as predicted behavior information set. The predicted behavior information set represents the set of the behavior information to be accumulated in the information distribution device 90 when it is assumed that the candidate request information {"merchandise X", "merchandise V" } is transmitted to the information distribution device 90.

Then, the privacy determination unit 27 generates the predicted behavior tendency information representing the tendency of the predicted behavior information set shown in FIG. 13 (Step S43). Here, it is assumed that the predicted behavior information shown in FIG. 13 is obtained as predicted behavior information.

Figure 14:
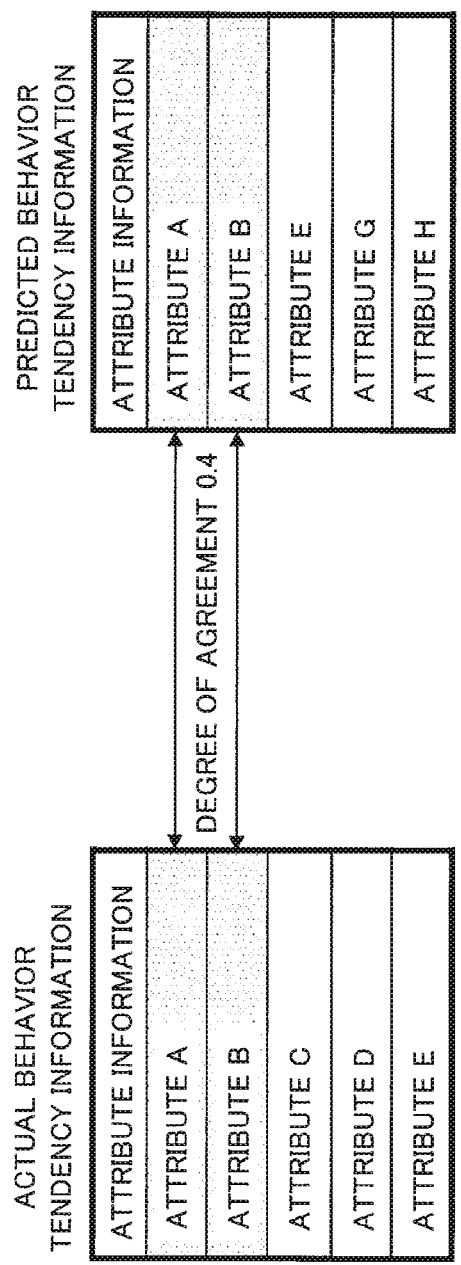
FIG. 14 is a figure schematically showing coincidental degree between the actual behavior tendency information and the predicted behavior tendency information according to the second exemplary embodiment of the present invention.

Then, the privacy determination unit 27 calculates the coincidental degree between the actual behavior tendency information shown in FIG. 9 and the predicted behavior tendency information shown in FIG. 13 (Step S44). Here, as shown in FIG. 14, the attribute information common to the actual behavior tendency information and the predicted behavior tendency information is the attribute information constituted with two elements ("attribute A", "attribute B"). Accordingly, the privacy determination unit 27 calculates "0.4", which is the ratio of the number 2 of common elements of the attribute information to the number 5 of elements of the predicted behavior tendency information, as the coincidental degree.

Then, the privacy determination unit 27 determines whether or not the coincidental degree calculated at Step S44 is equal to or higher than a predetermined threshold (Step S45). Here, it is assumed that the predetermined threshold is "0.3". In this case, the coincidental degree "0.4" calculated as above is higher than the predetermined threshold.

Therefore, the privacy determination unit 27 determines that there is privacy specific possibility with respect to the candidate request information {"merchandise X", "merchandise V" } including the tentative set of the pseudo behavior information {"merchandise V" } (Step S47, No at Step S25).

Accordingly, the request information generation unit 21 returns to Step S22, and selects the pseudo behavior information to be further added to the tentative set of the pseudo behavior information. Here, it is assumed that the request information generation unit 21 selects the pseudo behavior information "merchandise Z", and obtains {"merchandise V", "merchandise Z"} as tentative set of the pseudo behavior information (Step S23). It is also assumed that the request information generation unit 21 determines that there is privacy specific possibility with respect to the candidate request information including the tentative set of the pseudo behavior information (No at Step S24 and S25).

Accordingly, the request information generation unit 21 further selects the pseudo behavior information "merchandise U" (Step S22), and acquires "{merchandise V", "merchandise Z", "merchandise U"} as tentative set of the pseudo behavior information (Step S23).

Then, the request information generation unit 21 determines the privacy specific possibility with respect to the candidate request information including the tentative set of the pseudo behavior information {"merchandise V", "merchandise Z", "merchandise U"} generated at Step S23 by using the privacy determination unit 27 (Step S24).

The above will be described in further details.

First, the privacy determination unit 27 acquires the actual behavior tendency information shown in FIG. 9 (Step S41).

Figure 15:
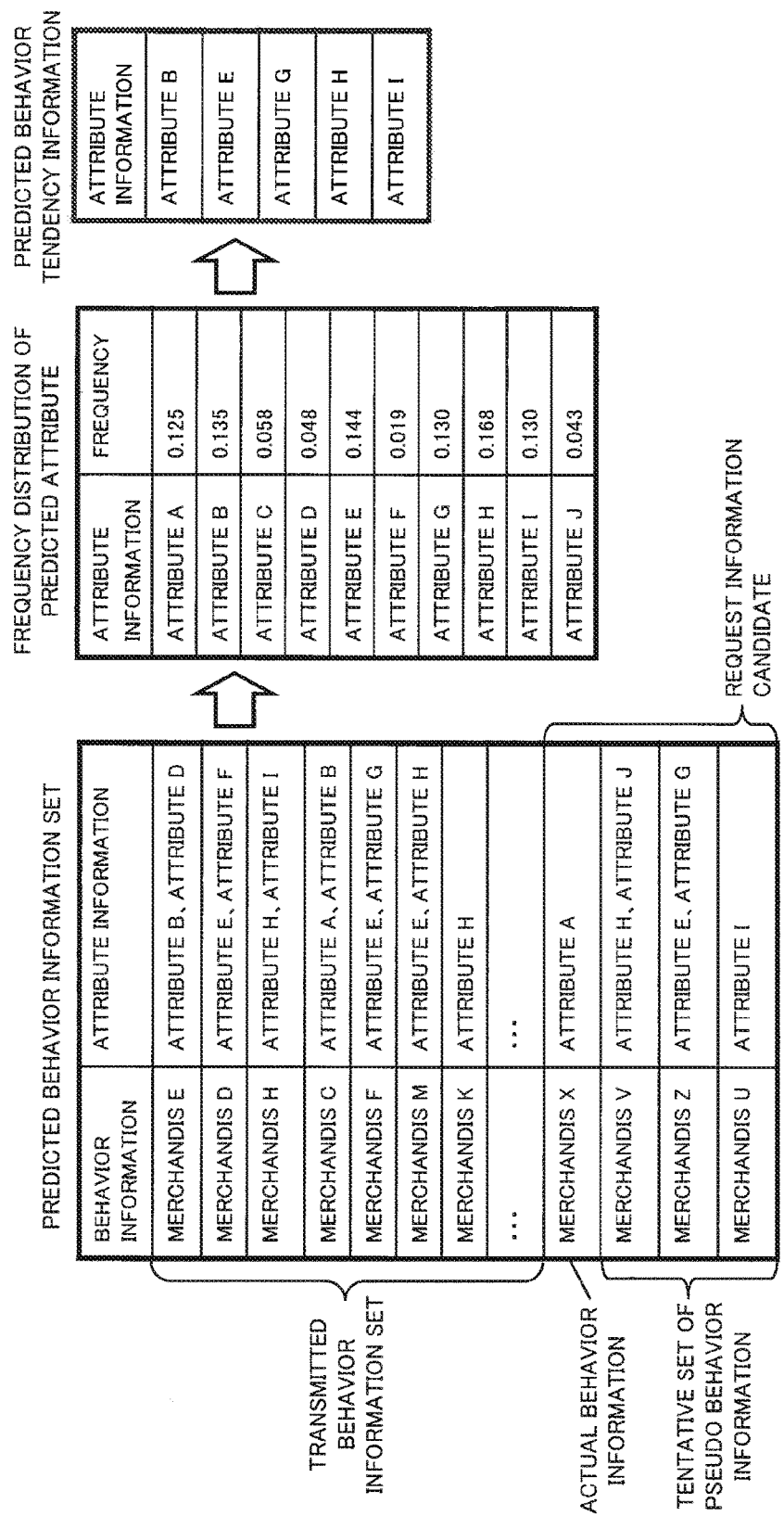
FIG. 15 is a figure showing an example of other predicted behavior tendency information, other predicted attribute frequency distribution, and other predicted behavior tendency information according to the second exemplary embodiment of the present invention.

Then, the privacy determination unit 27 generates the predicted behavior information set (Step S42). The predicted behavior information set includes the transmitted behavior information set shown in FIG. 10, the tentative set of the pseudo behavior information {"merchandise V", "merchandise Z", "merchandise U"} generated at Step S23, and the actual behavior information to be transmitted "merchandise X" acquired at Step S11. Here, it is assumed that the predicted behavior information set shown in FIG. 15 is acquired as predicted behavior information set. The predicted behavior information set represents the set of the behavior information to be accumulated in the information distribution device 90 when it is assumed that the candidate request information {"merchandise X", "merchandise V", "merchandise Z", "merchandise U"} is transmitted to the information distribution device 90.

Then, the privacy determination unit 27 generates the predicted behavior tendency information with respect to the predicted behavior information set shown in FIG. 15 (Step S43). Here, it is assumed that the attribute frequency distribution of the predicted behavior information set shown in FIG. 15 is obtained, as attribute frequency distribution of the predicted behavior information set. It is also assumed that the attribute information set shown in FIG. 15 is obtained as predicted behavior tendency information.

Figure 16:
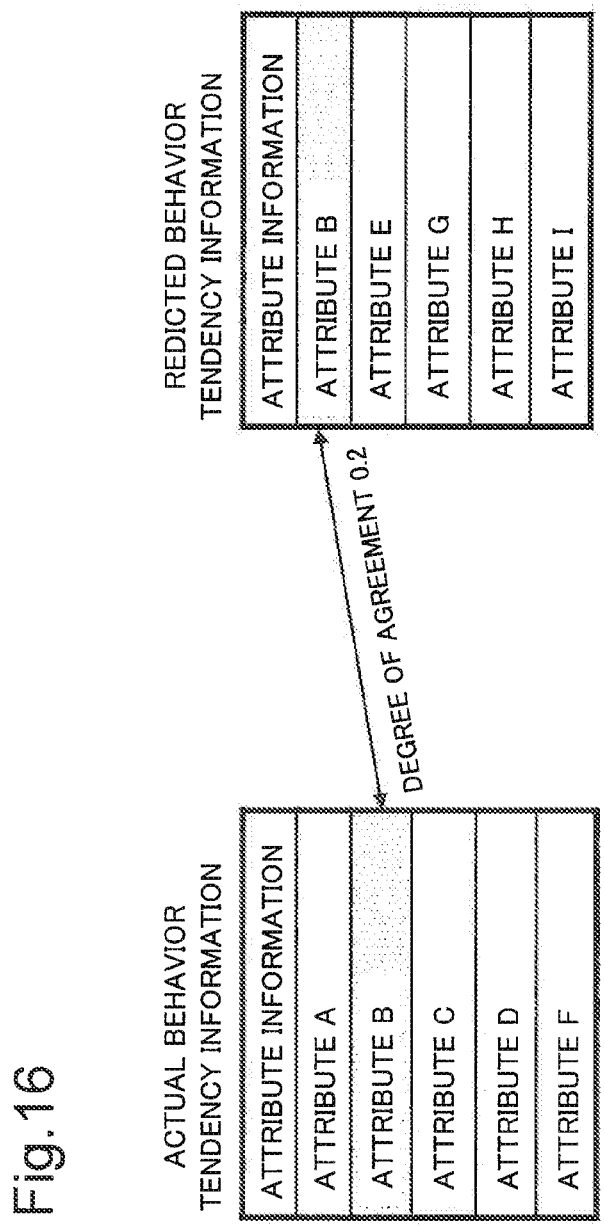
FIG. 16 is a figure schematically showing coincidental degree between the actual behavior tendency information and other predicted behavior tendency information according to the second exemplary embodiment of the present invention.

Then, the privacy determination unit 27 calculates the coincidental degree between the actual behavior tendency information shown in FIG. 9 and the predicted behavior tendency information shown in FIG. 15 (Step S44). Here, as shown in FIG. 16, the attribute information common to the actual behavior tendency information and the predicted behavior tendency information is "attribute B". Accordingly, the privacy determination unit 27 calculates "0.2", which is the ratio of the number 1 of common elements of the attribute information to the number 5 of elements of the predicted behavior tendency information as the coincidental degree. The coincidental degree 0.2 is lower than the predetermined threshold 0.3 (No at Step S45).

Therefore, the privacy determination unit 27 determines that there is no privacy specific possibility with respect to the candidate request information {"merchandise X", "merchandise V", "merchandise Z", "merchandise U"} including the tentative set of the pseudo behavior information {"merchandise V", "merchandise Z", "merchandise U"} (Step S46).

Accordingly, the request information generation unit 21 outputs {"merchandise V", "merchandise Z", "merchandise U"} as pseudo behavior information set (Step S26).

Then, the request information generation unit 21 generates the request information {"merchandise X", "merchandise V", "merchandise Z", "merchandise U"} (Step S13). Here, the request information {"merchandise X", "merchandise V", "merchandise Z", "merchandise U"} includes the pseudo behavior information set {"merchandise V", "merchandise Z", "merchandise U"} generated at Step S26, and the actual behavior information to be transmitted "merchandise X". The generated request information is the request information shown in FIG. 17.

Then, the distribution information request unit 12 transmits the request information {"merchandise X", "merchandise V", "merchandise Z", "merchandise U"} to the information distribution device 90 (Step S4).

Then, the information distribution device 90 returns the distribution information associated with the received request information (Step S5). To be more detailed, the information distribution device 90 returns the distribution information set composed of pairs of each of the behavior information included in the request information and the associated distribution information. In this case, as shown in FIG. 17, it is assumed that the information distribution device 90 returns {("merchandise X", "distribution information X"), ("merchandise V", distribution information V), ("merchandise Z", "distribution information Z"), ("merchandise U", "distribution information U")} as distribution information set.

Then, the distribution information request unit 12 of the information receiving device 20 receives the above-mentioned distribution information set (Step S6).

Figure 17:
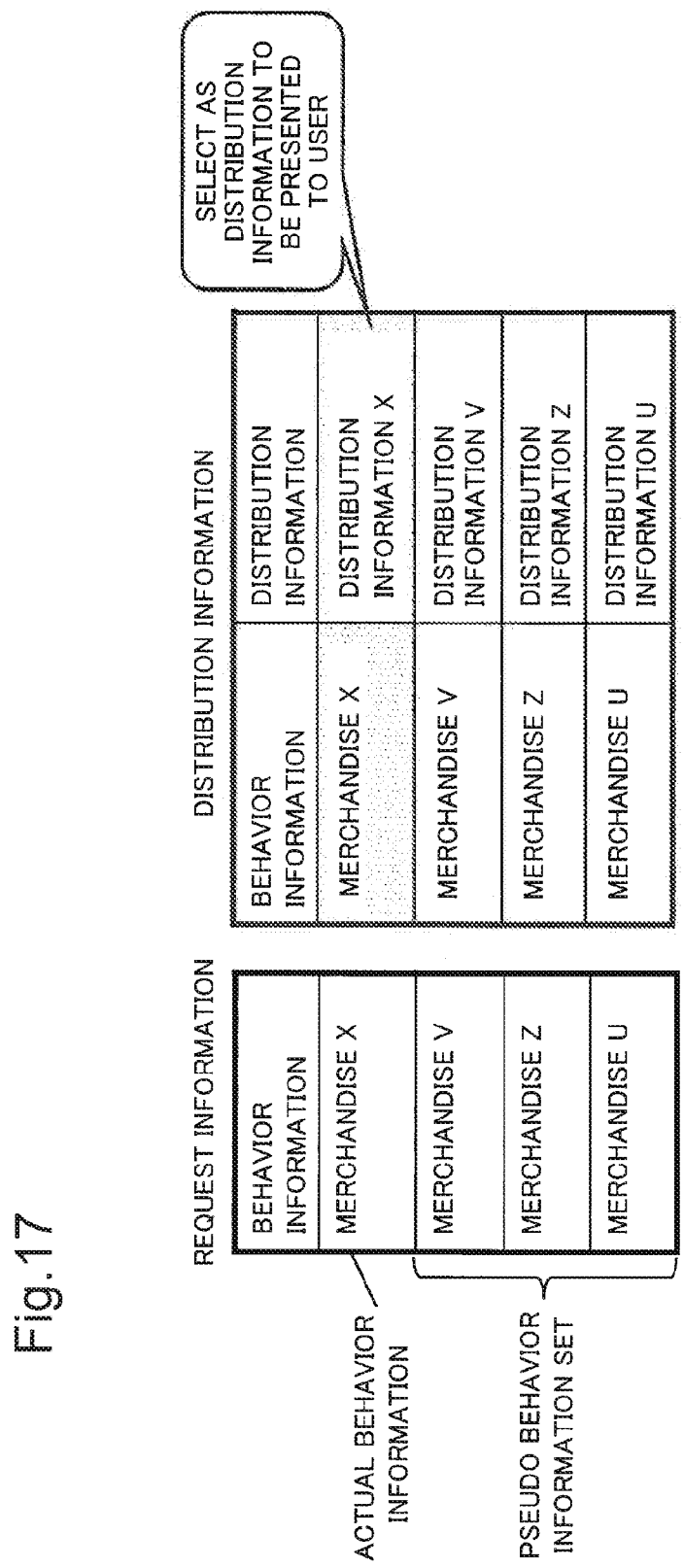
FIG. 17 is a figure showing an example of transmitted request information and distribution information distributed in response to the request information, according to the second exemplary embodiment of the present invention.

Then, the distribution information selection unit 13 selects "distribution information X" associated with the actual behavior information "merchandise X" included in the request information, out of the distribution information set shown in FIG. 17, and outputs "distribution information X" (Step S7).

The description of concrete example of the operation of the information receiving system 2 is completed as described above.

Advantageous effects of the second exemplary embodiment of the present invention will be described hereunder.

The information receiving system 2 according to the second exemplary embodiment of the present invention is capable of presenting the distribution information more appropriate for the user while more accurately protecting the privacy information representing the behavior of the user and the tendency thereof.

Reasons of the above are as follows. The privacy determination unit 27 utilizes the predicted behavior tendency information representing the tendency of the predicted behavior information set to be accumulated in the information distribution device 90 when it is assumed that the candidate request information is transmitted to the information distribution device 90. In addition, the privacy determination unit 27 utilizes the actual behavior tendency information representing the tendency of the actual behavior information set. Then, the privacy determination unit 27 determines the privacy specific possibility with respect to the candidate request information on the basis of the mentioned information. Then, the request information generation unit 21 generates the pseudo behavior information set to be included in the request information such that it is determined that there is no privacy specific possibility.

For example, when the behavior information possesses attribute, the privacy determination unit 27 generates the attribute information set, as actual behavior tendency information and predicted behavior tendency information. Then, the privacy determination unit 27 calculates the ratio of the number of elements of the attribute information common to the actual behavior tendency information and the predicted behavior tendency information, as the coincidental degree. Then, the privacy determination unit 27 determines whether or not there is privacy specific possibility based on whether or not the coincidental degree is equal to or higher than a predetermined threshold.

Another reason is that the request information generation unit 21 selects the candidate of the pseudo behavior information that has a higher evaluation value, as pseudo behavior information to be included in the pseudo behavior information set. Concretely, the request information generation unit 21 calculates the evaluation value based on variation of the information indicating the privacy specific possibility, with respect to the predicted behavior information set formed on the assumption that each candidate of the pseudo behavior information is included in the pseudo behavior information set.

Through the mentioned operation, the information receiving device 20 according to this exemplary embodiment can transmit the request information including not only the actual behavior information to be transmitted but also the set of the pseudo behavior information that makes it more difficult to specify the actual behavior and the tendency thereof, to the information distribution device 90. Therefore, the information receiving device 20 according to this exemplary embodiment can protect the behavior information of the user and the tendency of the user's behavior with higher accuracy.

Third Exemplary Embodiment

A third exemplary embodiment of the present invention will be described in details, with reference to the drawings. In the drawings referred to for the description of this exemplary embodiment, the same constituents and Steps as those of the first exemplary embodiment of the present invention will be given the same numeral, and the description thereof will not be repeated.

Figure 18:
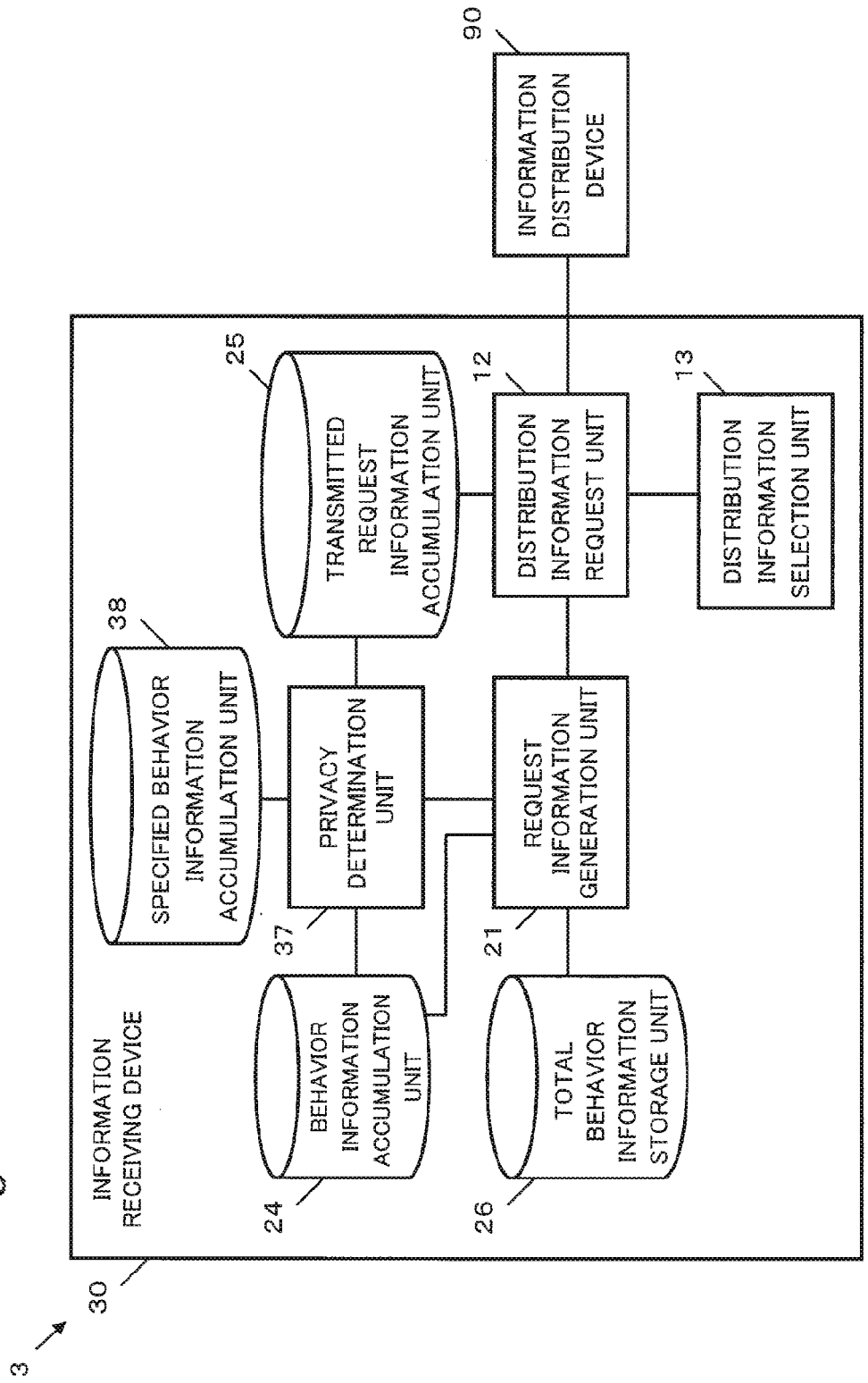
FIG. 18 is a functional block diagram of an information receiving system according to a third exemplary embodiment of the present invention.

FIG. 18 illustrates a functional block of an information receiving system 3 according to the third exemplary embodiment of the present invention. In FIG. 18, the information receiving system 3 is different from the information receiving system 2 according to the second exemplary embodiment of the present invention, in including an information receiving device 30 in place of the information receiving device 20. The information receiving device 30 is different from the information receiving device 20 according to the second exemplary embodiment of the present invention in including a privacy determination unit 37 in place of the privacy determination unit 27, and in further including a specified behavior information accumulation unit 38. The information receiving device 30 may be constituted of a computer device including the hardware elements described with reference to FIG. 2, like the information receiving device 20 according to the second exemplary embodiment of the present invention. In the configuration shown in FIG. 2, the specified behavior information accumulation unit 38 is realized by the storage device 1004. The hardware configuration of the information receiving device 30 and each functional block thereof are not limited to the above description.

Hereunder, each of the functional blocks of the information receiving device 30 will be described in details.

The specified behavior information accumulation unit 38 accumulates specified behavior information that is assumed to have been specified by the information distribution device 90.

The "specified behavior information" is the behavior information already specified by the information distribution device 90, despite not having been explicitly transmitted from the information receiving device 30 to the information distribution device 90.

The "explicit transmission" is the transmission for requesting the distribution information.

The specified behavior information as above is, for example, the specified behavior information specified in a service provided by the information distribution device 90. For example, it is assumed that the user of the information receiving device 30 utilizes the online retailing service of merchandise provided by the information distribution device 90. In this case, the purchase information or viewing information of the merchandise, which is the behavior information of the user of the service, is specified by the information distribution device 90, despite not being explicitly transmitted from the information receiving device 30 to the information distribution device 90.

In contrast, it is also assumed that the user of the information receiving device 30 utilizes an online retailing service provided by a device different from the information distribution device 90. In this case, the purchase information, which is the behavior information of the user of the service, is not accumulated in the information distribution device 90, unless the information receiving device 30 explicitly transmits such information to the information distribution device 90. Accordingly, such information is not the specified behavior information.

The specified behavior information accumulation unit 38 may accumulate the specified behavior information, for example, on the basis of a notice from an application of a client utilizing the service provided by the information distribution device 90. Hereinafter, the set of the behavior information accumulated in the specified behavior information accumulation unit 38 may be referred to as "specified behavior information set".

The privacy determination unit 37 determines the privacy specific possibility excluding the specified behavior tendency information included in the actual behavior tendency information and the predicted behavior tendency information.

The "specified behavior tendency information" is the information representing the tendency of the specified behavior information set.

For example, in the case where each of the attribute sets is generated as the actual behavior tendency information and the predicted behavior tendency information, the privacy determination unit 37 may generate an attribute information set as specified behavior tendency information. Concretely, the privacy determination unit 37 may acquire the attribute frequency distribution of the behavior information included in the specified behavior information set, and form a set including a predetermined number of elements of the attribute information from the high-ranking frequency, as specified behavior tendency information.

The privacy determination unit 37 may determine the number of elements of the attribute information except for the attribute information included in the specified behavior tendency information, among the attribute information common to the actual behavior tendency information and the predicted behavior tendency information, as number of elements of the common attribute information.

Through the mentioned operation, the privacy determination unit 37 calculates, as the coincidental degree, the ratio of the number of elements of the common attribute information except for the specified behavior tendency information, to the number of elements of the predicted behavior tendency information. Thus, the privacy determination unit 37 can determine the privacy specific possibility on the basis of the coincidental degree calculated as above.

An operation of the information receiving system 3 configured as above will be described with reference to the drawings. The information receiving system 3 performs generally in the same manner as the information receiving system 2 according to the second exemplary embodiment of the present invention, except for the details of the privacy determination process described referring to FIG. 8.

Figure 19:
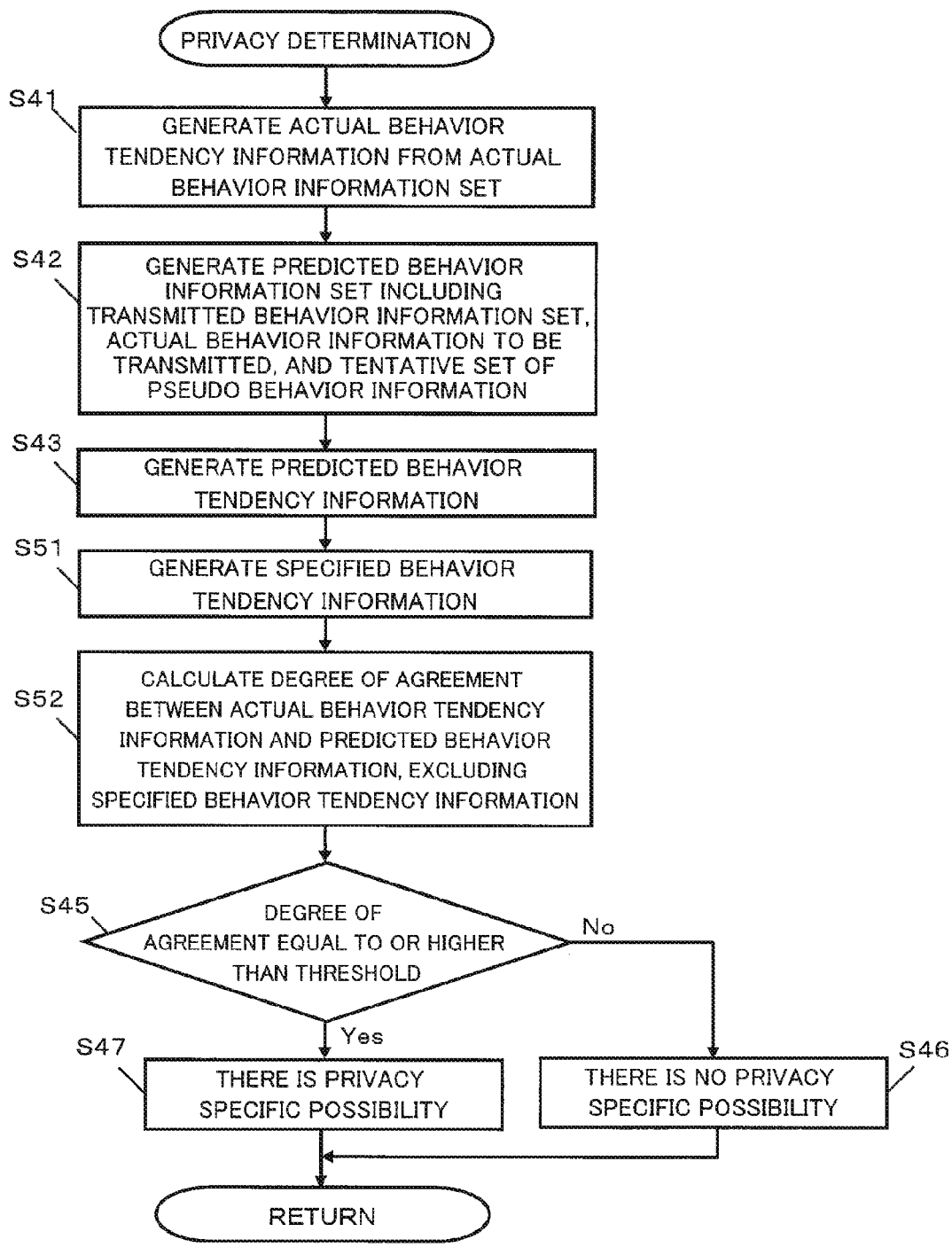
FIG. 19 is a flowchart for explaining a privacy determination process performed by the information receiving system according to the third exemplary embodiment of the present invention.

FIG. 19 illustrates the privacy determination process performed by the information receiving system 3.

In FIG. 19, first, the privacy determination unit 37 performs from Step S41 to Step S43 in the same manner as the privacy determination unit 27 according to the second exemplary embodiment of the present invention, and generates the actual behavior tendency information and the predicted behavior tendency information. For example, the privacy determination unit 37 may generate, as described earlier, a set including a predetermined number of elements of the attribute information from the high-ranking frequency, as actual behavior tendency information and predicted behavior tendency information, on the basis of the attribute frequency distribution in the respective behavior information sets.

Then, the privacy determination unit 37 generates the specified behavior tendency information with respect to the specified behavior information set accumulated in the specified behavior information accumulation unit 38 (Step S51). For example, as described above, the privacy determination unit 37 may generate a set including a predetermined number of elements of the attribute information from the high-ranking frequency, as specified behavior tendency information, on the basis of the attribute frequency distribution in the specified behavior information set.

Then, the privacy determination unit 37 calculates the coincidental degree between the actual behavior tendency information generated at Step S41 and the predicted behavior tendency information generated at Step S43, excluding the specified behavior tendency information (Step S52). For example, as described above, the privacy determination unit 37 determines the number of elements of the attribute information except for the attribute information included in the specified behavior tendency information, among the attribute information common to the actual behavior tendency information and the predicted behavior tendency information, as number of elements of the common attribute information. Thus, the privacy determination unit 37 may determine the ratio of the number of elements of the common attribute information as the coincidental degree.

Thereafter, the privacy determination unit 37 determines the privacy specific possibility through the process of Steps S45 to S47, on the basis of the coincidental degree calculated at Step S52, like the privacy determination unit 27 according to the second exemplary embodiment of the present invention.

The description of operation of the information receiving system 3 is completed as described above.

Hereunder, the operation of the information receiving system 3 will be described with reference to concrete information.

Here, it is assumed that, as in the second exemplary embodiment of the present invention, the behavior information accumulation unit 24 and the transmitted request information accumulation unit 25 respectively contain the information shown in FIG. 9 and FIG. 10.

It is also assumed that the specified behavior information accumulation unit 38 accumulates the specified behavior information set.

Hereunder, the information receiving system 3 selects "merchandise X" as actual behavior information to be transmitted, and generates {"merchandise V"} as tentative set of the pseudo behavior information, as in the second exemplary embodiment of the present invention.

Hereunder, the privacy determination process with respect to the candidate request information including the tentative set of the pseudo behavior information {"merchandise V"} will be described.

First, the privacy determination unit 37 performs the Steps S41 to S43 in the same manner as the second exemplary embodiment of the present invention. Based on above process, the attribute information set shown in FIG. 9 is generated as actual behavior tendency information. Likewise, the attribute information set shown in FIG. 13 is generated as predicted behavior tendency information.

Then, the privacy determination unit 37 looks up the specified behavior information accumulation unit 38, and generates the specified behavior tendency information (Step S51). In this example, the privacy determination unit 37 generates a set including five elements of the attribute information from the high-ranking frequency out of the specified behavior information set, as shown in FIG. 20.

Figure 20:
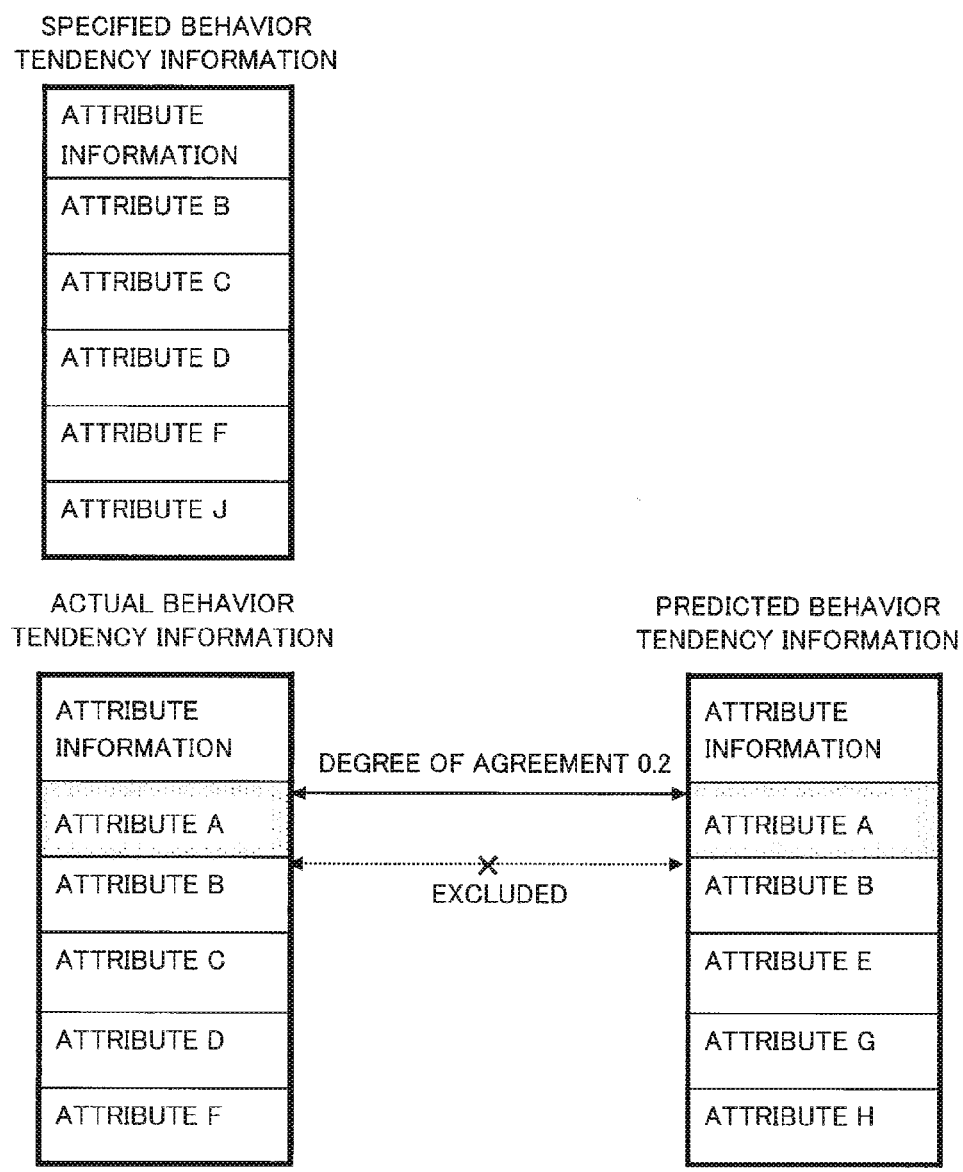
FIG. 20 is a figure schematically showing coincidental degree between specified behavior tendency information, and the actual behavior tendency information and the predicted behavior tendency information, according to the third exemplary embodiment of the present invention.

As shown in FIG. 20, the attribute information common to the actual behavior tendency information and the predicted behavior tendency information is "attribute A" and "attribute B". However, the common attribute information includes "attribute B" which is the specified behavior tendency information, as shown in FIG. 20. Accordingly, the privacy determination unit 37 excludes the specified behavior tendency information "attribute B", and regards "attribute A" as common attribute information. Then, the privacy determination unit 37 calculates the coincidental degree "0.2", as ratio of the number of elements of the attribute information 1 to the number of elements of the predicted behavior tendency information 5.

Then, the privacy determination unit 37 determines that the coincidental degree 0.2 is lower than the predetermined threshold 0.3 (No at Step S45).

Therefore, the privacy determination unit 37 determines that there is no privacy specific possibility with respect to the candidate request information {"merchandise X", "merchandise V" } including the tentative set of the pseudo behavior information {"merchandise V" } (Step S46).

Based on such determination, the request information generation unit 21 adopts {"merchandise V" } as pseudo behavior information set (Step S26).

Figure 21:
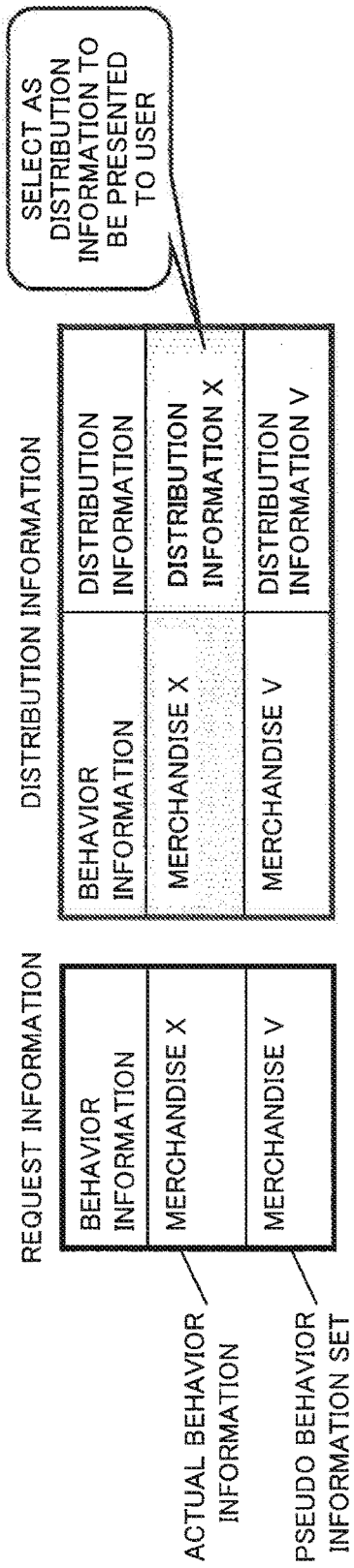
FIG. 21 is a figure showing an example of the transmitted request information and the distribution information distributed in response to the request information, according to the third exemplary embodiment of the present invention.

Therefore, the request information generation unit 21 generates the request information {"merchandise X", "merchandise V"} shown in FIG. 21 (Step S13), and transmits the request information to the information distribution device 90 (Step S4).

Then, the information distribution device 90 returns the distribution information associated with the received request information (Step S55). In this example, it is assumed that the information distribution device 90 returns the distribution information set {("merchandise X", "distribution information X"), ("merchandise V", "distribution information V")} shown in FIG. 21.

Then, the distribution information request unit 12 of the information receiving device 30 receives the distribution information set (Step S6).

Then, the distribution information selection unit 13 selects "distribution information X" associated with the actual behavior information "merchandise X" included in the request information, out of the distribution information set shown in FIG. 21, and outputs it (Step S7).

The description of operation of the information receiving system 3 is completed as described above.

Advantageous effects of the third exemplary embodiment of the present invention will be described hereunder.

The information receiving system 3 according to third exemplary embodiment of the present invention enables both protection of user's privacy and provision of distribution information more appropriate for the user. The information receiving system 3 according to third exemplary embodiment of the present invention can also alleviate the load on the information receiving device and the information distribution device base on transmission and reception of the request information in which the pseudo behavior information is mixed.

A reason of the above is that the specified behavior information accumulation unit 38 accumulates the specified behavior information that is assumed to have already been specified despite not having been explicitly transmitted to the information distribution device. The privacy determination unit 37 excludes the specified behavior tendency information included in the actual behavior tendency information and the predicted behavior tendency information, and determines the privacy specific possibility.

As described above, this exemplary embodiment excludes the tendency of the behavior already specified by the service provider operating the information distribution device 90 from the object of protection. Based on the process, this exemplary embodiment can further reduce the amount of the pseudo behavior information mixed in the request information, and protect the user's actual behavior and the tendency of user's actual behavior which are not specified by the service provider while reducing the amount of information transmitted and received.

In the second and third exemplary embodiments of the present invention described above, it is described around the example in which the privacy determination unit 27 and the privacy determination unit 37 determine the privacy specific possibility on the basis of the coincidental degree between the actual behavior tendency information and the predicted behavior tendency information.

However, without limitation to the above, the privacy determination units of the respective exemplary embodiments may determine the privacy specific possibility on the basis of different index. The different index may be the index which indicates a degree of difficulty to specify the actual behavior and the tendency thereof on the basis of the predicted behavior information set which is the set accumulated on the side of the information distribution device when it is assumed that the candidate request information is transmitted to the information distribution device.

In the second and third exemplary embodiments of the present invention described above, it is described around the example in which the operation of the privacy determination unit 27 and the privacy determination unit 37 generates, as behavior tendency information, the attribute information set representing the tendency of the attribute of the behavior information included in the associated behavior information set. However, without limitation to the above, the behavior tendency information may be other types of information which represents the tendency of the behavior information set.

In the third exemplary embodiment of the present invention described above, it is described around the example in which the privacy determination unit 37 calculates the coincidental degree. Namely, the privacy determination unit 37 calculates the ratio of the number of elements of the attribute information common to the actual behavior tendency information and the predicted behavior tendency information, except for the attribute information included in the specified behavior tendency information. However, without limitation to the above, the privacy determination unit 37 may adopt a method different from excluding the specified behavior tendency information from the actual behavior tendency information and the predicted behavior tendency information, and calculate the coincidental degree.

In the second and third exemplary embodiments of the present invention described above, it is described around the example in which the request information generation unit 21 generates the pseudo behavior information set by sequentially adding the pseudo behavior information until it is determined that there is no privacy specific possibility.

However, the request information generation unit 21 does not need to use sequential addition of the pseudo behavior information. For example, the request information generation unit 21 may generate a plurality of tentative sets of the pseudo behavior information, and select the tentative set, which is determined that there is no privacy specific possibility, from them.

In the second and third exemplary embodiments of the present invention described above, it is described around the example in which the operation of the request information generation unit 21 selects the pseudo behavior information on the basis of the evaluation value. However, without limitation to the above, the request information generation unit 21 may select the pseudo behavior information by using a different method and include the selected information in the request information.

In the second and third exemplary embodiments of the present invention described above, it is described the example in which the request information generation unit 21 calculates the following as the referred value when selecting the pseudo behavior information. That is, it is described around the example in which the value based on the variation of the attribute frequency distribution of the predicted behavior information set with respect to the attribute frequency distribution of the transmitted behavior information set is calculated, as value to be calculated. However, without limitation to the above, the request information generation unit 21 may adopt a calculation method that makes the evaluation value higher, the lower the specific possibility of the attribute information closely related to the user's actual behavior being specified is.

In the second and third exemplary embodiments of the present invention described above, it is described the example in which the information of the purchased merchandise is adopted as behavior information, and the category of the merchandise is adopted as attribute information. However, the behavior information and the attribute information of the behavior information may be different types of information.

In the exemplary embodiments of the present invention described above, it is described around the example in which the distribution information request unit 12 transmits the behavior information set generated as request information to the information distribution device 90, and receives the set of the associated distribution information. However, without limitation to the above, the distribution information request unit 21 according to each of the exemplary embodiments may separately transmit each of the elements of the behavior information included in the generated request information to the information distribution device 90, and separately receive each of the associated elements of the distribution information. In this case, the distribution information selection unit 13 may associate each of the elements of the behavior information included in the request information with each of the associated elements of the distribution information received in response, and select the distribution information associated with the actual behavior information.

With the mentioned arrangement, the information distribution device 90 according to each of the exemplary embodiments does not need to have the special function of returning the distribution information set associated with the received behavior information set. The information distribution device 90 should have an ordinary function of returning the distribution information associated with the received behavior information. That is, in this case, the information receiving device according to each of the exemplary embodiments is capable of more accurately protecting the privacy information representing the user's behavior and the tendency thereof, even in the case of requesting the distribution information to an ordinary information distribution device 90. The information receiving device according to each of the exemplary embodiments can present the distribution information more appropriate to the user, while protecting the privacy information.

In each of the exemplary embodiments of the present invention represent described above, it is described around the example in which the information receiving device collects the actual behavior information of the user and presents the distribution information to the user. However, the information receiving device according to each of the exemplary embodiments does not need to have the function of collecting the actual behavior information and presenting the distribution information. For example, the information receiving device according to each of the exemplary embodiments may be configured with connected to a user terminal which has the function of collecting the actual behavior information and presenting the distribution information.

In each of the exemplary embodiments of the present invention represent, it is described around the example in which the functional blocks of the information receiving device are realized by using the CPU 1001 which executes the computer program stored in the storage device 1004 and/or ROM 1003. However, a part or the whole of the functional blocks, or any combination thereof may be realized by using dedicated hardware circuits.

In each of the exemplary embodiments of the present invention, the functional blocks of the information receiving device may be separated into a plurality of devices.

In the foregoing exemplary embodiments of the present invention, the operation process of the information receiving device described with reference to the flowcharts may be stored in a storage device (storage medium) of a computer device, as computer program according to the present invention. The CPU 1001 may read out such a computer program to execute the same. In such a case, the present invention includes the code of the computer program or the recording medium.

The foregoing exemplary embodiments may be realized in a desired combination.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-053077, filed on Mar. 15, 2013, the disclosure of which is incorporated herein in its entirety by reference.

The whole or part of the exemplary embodiments disclosed above can be described as, but not limited to, the following supplementary notes.

(Supplementary Note 1)

An information receiving device includes:

a request information generation unit which generates request information including actual behavior information which is behavior information representing an actual behavior of a user, and pseudo behavior information not representing an actual behavior of the user;

a distribution information request unit which transmits the request information to an information distribution device, and receives distribution information distributed from the information distribution device on a basis of the transmission of the request information; and a distribution information selection unit which selects distribution information associated with the actual behavior information, out of the distribution information received by the distribution information request unit.

(Supplementary Note 2)

The information receiving device according to supplementary note 1, further includes:

a behavior information accumulation unit which accumulates the actual behavior information;

a transmitted request information accumulation unit which accumulates behavior information included in the request information transmitted to the information distribution device; and a privacy determination unit which generates a set including the transmitted behavior information set accumulated in the transmitted request information accumulation unit and behavior information included in a candidate of the request information, as predicted behavior information set to be accumulated in the information distribution device when it is assumed that the candidate of the request information is transmitted to the information distribution device, generates predicted behavior tendency information representing tendency of the generated predicted behavior information set, generates actual behavior tendency information representing tendency of the actual behavior information set accumulated in the behavior information accumulation unit, and determines whether or not there is privacy specific possibility which is possibility specified the actual behavior or tendency of the user, when it is assumed that the candidate request information is transmitted, based on the predicted the behavior tendency information and the actual behavior tendency information, wherein the request information generates unit generates the pseudo behavior information set to be included in the request information, such that it is determined that there is no privacy specific possibility.

(Supplementary Note 3)

The information receiving device according to supplementary note 2, wherein the privacy determination unit generates, as the actual behavior tendency information, a set of attribute information representing tendency of attribute of the behavior information included in the actual behavior information set, generates, as the predicted behavior tendency information, a set of attribute information representing tendency of attribute of the behavior information included in the predicted behavior information set, and determines the privacy specific possibility on a basis of the attribute information common to the actual behavior tendency information and the predicted behavior tendency information.

(Supplementary Note 4)

The information receiving device according to supplementary note 2 or 3, further includes:

a specified behavior information accumulation unit which accumulates specified behavior information assumed to be specified by the information distribution device, wherein the privacy determination unit generates specified behavior tendency information representing tendency of the specified behavior information set accumulated in the specified behavior information accumulation unit, and determines the privacy specified possibility excluding the specified behavior tendency information included in the predicted behavior tendency information and the actual behavior tendency information.

(Supplementary Note 5)

The information receiving device according to any one of supplementary notes 2 to 4, wherein the request information generation unit generates the pseudo behavior information set by sequentially adding the pseudo behavior information until it is determined that there is no privacy specific possibility.

(Supplementary Note 6)

The information receiving device according to any one of supplementary notes 2 to 5, wherein the request information generation unit calculates, with respect to each of candidates of the pseudo behavior information, an evaluation value based on variation of information representing the privacy specific possibility, when it is assumed that the candidate request information to which the candidate has been added is transmitted, and selects the pseudo behavior information to be included in the pseudo behavior information set among the candidates, on a basis of the calculated evaluation value.

(Supplementary Note 7)

The information receiving device according to supplementary note 6, wherein the request information generation unit calculates the evaluation value on a basis of variation of frequency distribution of attribute information in the predicted behavior information set with respect to frequency distribution of attribute information in the transmitted behavior information set.

(Supplementary Note 8)

The information receiving device according to any one of supplementary notes 1 to 6, further includes:

a total behavior information storage unit which stores behavior information assumed to be generated, wherein the request information generation unit selects the pseudo behavior information from the total behavior information storage unit.

(Supplementary Note 9)

An information receiving system includes:

the information receiving device according to any one of supplementary notes 1 to 7; and an information distribution device which returns distribution information based on the request information transmitted from the information receiving device.

(Supplementary Note 10)

An information receiving method to be executed by an information receiving device, the method includes:

generating request information including actual behavior information which is behavior information representing an actual behavior of a user, and pseudo behavior information not representing an actual behavior of the user;

transmitting the request information to an information distribution device, and receiving distribution information distributed from the information distribution device on a basis of the transmission of the request information; and selecting distribution information associated with the actual behavior information, out of the received distribution information.

(Supplementary Note 11)

The method according to supplementary note 10, further includes:

accumulating the actual behavior information;

accumulating behavior information included in the request information transmitted to the information distribution device;

generating a set including the transmitted behavior information set and behavior information included in a candidate of the request information, as predicted behavior information set to be accumulated in the information distribution device when it is assumed that the candidate of the request information is transmitted to the information distribution device;

generating predicted behavior tendency information representing tendency of the generated predicted behavior information set;

generating actual behavior tendency information representing tendency of the actual behavior information set;

determining whether or not there is privacy specific possibility which is possibility specified the actual behavior or tendency of the user, when it is assumed that the candidate request information is transmitted, based on the predicted the behavior tendency information and the actual behavior tendency information; and generating the pseudo behavior information set to be included in the request information, such that it is determined that there is no privacy specific possibility.

(Supplementary Note 12)

A computer-readable non-transitory storage medium embodying a program, the program causing an information receiving device to perform a method, the method comprising:

generating request information including actual behavior information which is behavior information representing an actual behavior of a user, and pseudo behavior information not representing an actual behavior of the user;

transmitting the request information to an information distribution device, and receiving distribution information distributed from the information distribution device on a basis of the transmission of the request information; and selecting distribution information associated with the actual behavior information, out of the received distribution information.

(Supplementary Note 13)

The computer-readable non-transitory storage medium according to supplementary note 12, wherein the method further comprising:

accumulating the actual behavior information;

accumulating behavior information included in the request information transmitted to the information distribution device;

generating a set including the transmitted behavior information set and behavior information included in a candidate of the request information, as predicted behavior information set to be accumulated in the information distribution device when it is assumed that the candidate of the request information is transmitted to the information distribution device;

generating predicted behavior tendency information representing tendency of the generated predicted behavior information set;

generating actual behavior tendency information representing tendency of the actual behavior information set;

determining whether or not there is privacy specific possibility which is possibility specified the actual behavior or tendency of the user, when it is assumed that the candidate request information is transmitted, based on the predicted the behavior tendency information and the actual behavior tendency information; and generating the pseudo behavior information set to be included in the request information, such that it is determined that there is no privacy specific possibility.

REFERENCE SINGS LIST 1, 2, 3 Information receiving system
10, 20, 30 Information receiving device
11, 21 Request information generation unit
12 Distribution information request unit
13 Distribution information selection unit
24 Behavior information accumulation unit
25 Transmitted request information accumulation unit
26 Total behavior information storage unit
27, 37 Privacy determination unit
38 Specified behavior information accumulation unit
90 Information distribution device
1001, 9001 CPU
1002, 9002 RAM
1003, 9003 ROM
1004, 9004 Storage device
1005, 9005 Network interface
1006 Input device
1007 Output device

The invention claimed is:

1. An information receiving device comprising:
a central processing unit (CPU); and
a memory connected with the CPU and storing a program, wherein
the CPU reads the program from the memory and thereby implements:
a request information generation unit which generates request information including actual behavior information which is behavior information representing an actual behavior of a user, and pseudo behavior information which does not represent the actual behavior of the user, which is assumed to be generated, and which maintains the confidentiality of the actual behavior information;
a distribution information request unit which transmits the request information to an information distribution device, and receives distribution information distributed from the information distribution device on a basis of the transmission of the request information;
a distribution information selection unit which selects distribution information associated with the actual behavior information, out of the distribution information received by the distribution information request unit;
a behavior information accumulation unit which accumulates the actual behavior information;
a transmitted request information accumulation unit which accumulates behavior information included in the request information transmitted to the information distribution device; and
a privacy determination unit which generates a set including the transmitted behavior information set accumulated in the transmitted request information accumulation unit and behavior information included in a candidate of the request information, as predicted behavior information set to be accumulated in the information distribution device when it is assumed that the candidate of the request information is transmitted to the information distribution device, generates predicted behavior tendency information representing tendency of the generated predicted behavior information set, generates actual behavior tendency information representing tendency of the actual behavior information set accumulated in the behavior information accumulation unit, and determines whether or not there is a privacy specific possibility which is a possibility that specifies the actual behavior or tendency of the user, when it is assumed that the candidate request information is transmitted, based on the predicted the behavior tendency information and the actual behavior tendency information, wherein the request information generates unit generates the pseudo behavior information set to be included in the request information, such that it is determined that there is no privacy specific possibility.

2. The information receiving device according to claim 1, wherein the privacy determination unit generates, as the actual behavior tendency information, a set of attribute information representing tendency of attribute of the behavior information included in the actual behavior information set, generates, as the predicted behavior tendency information, a set of attribute information representing tendency of attribute of the behavior information included in the predicted behavior information set, and determines the privacy specific possibility on a basis of the attribute information common to the actual behavior tendency information and the predicted behavior tendency information.

3. The information receiving device according to claim 1, wherein the CPU further implements:

a specified behavior information accumulation unit which accumulates specified behavior information assumed to be specified by the information distribution device, wherein the privacy determination unit generates specified behavior tendency information representing tendency of the specified behavior information set accumulated in the specified behavior information accumulation unit, and determines the privacy specified possibility excluding the specified behavior tendency information included in the predicted behavior tendency information and the actual behavior tendency information.

4. The information receiving device according to claim 1, wherein the request information generation unit generates the pseudo behavior information set by sequentially adding the pseudo behavior information until it is determined that there is no privacy specific possibility.

5. The information receiving device according to claim 1, wherein the request information generation unit calculates, with respect to each of candidates of the pseudo behavior information, an evaluation value based on variation of information representing the privacy specific possibility, when it is assumed that the candidate request information to which the candidate has been added is transmitted, and selects the pseudo behavior information to be included in the pseudo behavior information set among the candidates, on a basis of the calculated evaluation value.

6. The information receiving device according to claim 5, wherein the request information generation unit calculates the evaluation value on a basis of variation of frequency distribution of attribute information in the predicted behavior information set with respect to frequency distribution of attribute information in the transmitted behavior information set.

7. The information receiving device according to claim 1, wherein the CPU further implements:

a total behavior information storage unit which stores behavior information assumed to be generated, wherein the request information generation unit selects the pseudo behavior information from the total behavior information storage unit.

8. An information receiving method to be executed by an information receiving device which comprises a central processing unit (CPU) and a memory connected with the CPU and storing a program, wherein the CPU reads the program from the memory and thereby executes the method comprising:

generating request information including actual behavior information which is behavior information representing an actual behavior of a user, and pseudo behavior information which does not represent the actual behavior of the user, which is assumed to be generated, and which maintains the confidentiality of the actual behavior information;

transmitting the request information to an information distribution device, and receiving distribution information distributed from the information distribution device on a basis of the transmission of the request information;

selecting distribution information associated with the actual behavior information, out of the received distribution information;

accumulating the actual behavior information;

accumulating behavior information included in the request information transmitted to the information distribution device;

generating a set including the transmitted behavior information set and behavior information included in a candidate of the request information, as predicted behavior information set to be accumulated in the information distribution device when it is assumed that the candidate of the request information is transmitted to the information distribution device;

generating predicted behavior tendency information representing tendency of the generated predicted behavior information set;

generating actual behavior tendency information representing tendency of the actual behavior information set;

determining whether or not there is a privacy specific possibility which is a possibility that specifies the actual behavior or tendency of the user, when it is assumed that the candidate request information is transmitted, based on the predicted the behavior tendency information and the actual behavior tendency information; and generating the pseudo behavior information set to be included in the request information, such that it is determined that there is no privacy specific possibility.

9. A computer-readable non-transitory storage medium embodying a program for causing an information receiving device, which comprises a central processing unit (CPU) and a memory connected with the CPU and storing the program, wherein the CPU reads the program from the memory and thereby executes a method comprising:
- generating request information including actual behavior information which is behavior information representing an actual behavior of a user, and pseudo behavior information which does not represent the actual behavior of the user, which is assumed to be generated, and which maintains the confidentiality of the actual behavior information;
- transmitting the request information to an information distribution device, and receiving distribution information distributed from the information distribution device on a basis of the transmission of the request information;
- selecting distribution information associated with the actual behavior information, out of the received distribution information;
- accumulating the actual behavior information;
- accumulating behavior information included in the request information transmitted to the information distribution device;
- generating a set including the transmitted behavior information set and behavior information included in a candidate of the request information, as predicted behavior information set to be accumulated in the information distribution device when it is assumed that the candidate of the request information is transmitted to the information distribution device;
- generating predicted behavior tendency information representing tendency of the generated predicted behavior information set;
- generating actual behavior tendency information representing tendency of the actual behavior information set;
- determining whether or not there is a privacy specific possibility which is a possibility that specifies the actual behavior or tendency of the user, when it is assumed that the candidate request information is transmitted, based on the predicted the behavior tendency information and the actual behavior tendency information; and
- generating the pseudo behavior information set to be included in the request information, such that it is determined that there is no privacy specific possibility.

* * * * *

UNITED STATES PATENT AND TRADEMARK OFFICE
CERTIFICATE OF CORRECTION

PATENT NO. : 9,817,996 B2
APPLICATION NO. : 14/775805
DATED : November 14, 2017
INVENTOR(S) : Ryo Furukawa Page 1 of 1

It is certified that error appears in the above-identified patent and that said Letters Patent is hereby corrected as shown below:

In the Specification

Column 27, Line 47:
"21" has been replaced with --12--

Signed and Sealed this
Twenty-seventh Day of March, 2018

Andrei Iancu
*Director of the United States Patent and Trademark Office*